United States Patent
Wiebe et al.

(10) Patent No.: US 9,803,487 B2
(45) Date of Patent: Oct. 31, 2017

(54) CONVERGING FLOW JOINT INSERT SYSTEM AT AN INTERSECTION BETWEEN ADJACENT TRANSITIONS EXTENDING BETWEEN A COMBUSTOR AND A TURBINE ASSEMBLY IN A GAS TURBINE ENGINE

(71) Applicant: Siemens Energy, Inc., Orlando, FL (US)

(72) Inventors: David J. Wiebe, Orlando, FL (US); Andrew Carlson, Jupiter, FL (US); Kyle C. Stoker, North Palm Beach, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 0 days.

(21) Appl. No.: 15/318,078

(22) PCT Filed: Jun. 26, 2014

(86) PCT No.: PCT/US2014/044274
§ 371 (c)(1),
(2) Date: Dec. 12, 2016

(87) PCT Pub. No.: WO2015/199693
PCT Pub. Date: Dec. 30, 2015

(65) Prior Publication Data
US 2017/0114652 A1   Apr. 27, 2017

(51) Int. Cl.
*F01D 9/02* (2006.01)
*F01D 9/04* (2006.01)
(Continued)

(52) U.S. Cl.
CPC .............. *F01D 9/023* (2013.01); *F01D 5/02* (2013.01); *F01D 9/00* (2013.01); *F01D 9/02* (2013.01);
(Continued)

(58) Field of Classification Search
CPC ... F01D 9/00; F01D 9/02; F01D 9/023; F01D 9/047; F01D 25/28; F02C 7/20;
(Continued)

(56) References Cited

U.S. PATENT DOCUMENTS 2,596,646 A   5/1952   Buchi
2,967,013 A   1/1961   Dallenbach et al.
(Continued)

FOREIGN PATENT DOCUMENTS

EP   2660519 A1   11/2013
EP   26604227 A1   11/2013

OTHER PUBLICATIONS

PCT International Search Report and Written Opinion dated Oct. 22, 2014 corresponding to PCT Application PCT/US2014/044274 filed Jun. 26, 2014. (12 pages).

*Primary Examiner* — Gerald L Sung
*Assistant Examiner* — Scott Walthour

(57) ABSTRACT

A transition duct system for routing a gas flow in a combustion turbine engine is provided. The transition duct system includes one or more converging flow joint inserts forming a trailing edge at an intersection between adjacent transition ducts. The converging flow joint insert may be contained within a converging flow joint insert receiver and may be disconnected from the transition duct bodies by which the converging flow joint insert is positioned. Being disconnected eliminates stress formation within the converging flow joint insert, thereby enhancing the life of the insert. The converging flow joint insert may be removable such that the insert can be replaced once worn beyond design limits.

14 Claims, 21 Drawing Sheets

(51) Int. Cl.
*F01D 25/28* (2006.01)
*F02C 7/20* (2006.01)
*F23R 3/00* (2006.01)
*F23R 3/60* (2006.01)
*F01D 5/02* (2006.01)
*F01D 9/06* (2006.01)
*F01D 9/00* (2006.01)
*F23R 3/46* (2006.01)
*F23R 3/42* (2006.01)
*F02C 3/14* (2006.01)

(52) U.S. Cl.
CPC ............. *F01D 9/047* (2013.01); *F01D 9/065* (2013.01); *F01D 25/28* (2013.01); *F02C 7/20* (2013.01); *F23R 3/002* (2013.01); *F23R 3/60* (2013.01); *F02C 3/14* (2013.01); *F05D 2220/32* (2013.01); *F05D 2240/10* (2013.01); *F05D 2260/20* (2013.01); *F05D 2260/94* (2013.01); *F05D 2260/941* (2013.01); *F23R 3/425* (2013.01); *F23R 3/46* (2013.01); *F23R 2900/00005* (2013.01)

(58) Field of Classification Search
CPC .... F02C 3/14; F05D 2240/10; F05D 2240/35; F05D 2250/25; F05D 2250/322; F05D 2250/38; F05D 2260/94; F05D 2260/941; F23R 3/002; F23R 3/425; F23R 3/46; F23R 3/52; F23R 3/54; F23R 3/60; F23R 2900/00005; F23R 2900/00017; F23R 2900/00019

See application file for complete search history.

(56) References Cited

U.S. PATENT DOCUMENTS

| | | |
|---|---|---|
| 3,184,152 A | 5/1965 | Bourquad |
| 3,333,762 A | 8/1967 | Vrana |
| 3,420,435 A | 7/1969 | Jarosz et al. |
| 3,484,039 A | 12/1969 | Mittelstaedt |
| 3,657,882 A | 4/1972 | Hugoson |
| 3,743,436 A | 7/1973 | O'Conner |
| 4,164,845 A | 8/1979 | Exley et al. |
| 4,368,005 A | 1/1983 | Exley et al. |
| 4,565,505 A | 1/1986 | Wollenweber |
| 5,039,317 A | 8/1991 | Thompson et al. |
| 5,145,317 A | 9/1992 | Brasz |
| 5,320,489 A | 6/1994 | McKenna |
| 6,280,139 B1 | 8/2001 | Romani et al. |
| 6,589,015 B1 | 7/2003 | Roberts et al. |
| 6,845,621 B2 | 1/2005 | Teets |
| 8,113,003 B2 | 2/2012 | Charron et al. |
| 2006/0127827 A1 | 6/2006 | Yoshida |
| 2010/0077719 A1 | 4/2010 | Wilson et al. |
| 2011/0203282 A1 | 8/2011 | Charron et al. |
| 2013/0283818 A1* | 10/2013 | Flanagan ................ F01D 9/023 60/800 |
| 2014/0010644 A1 | 1/2014 | Charron et al. |
| 2015/0132117 A1* | 5/2015 | Marra ..................... F01D 9/023 415/187 |

* cited by examiner

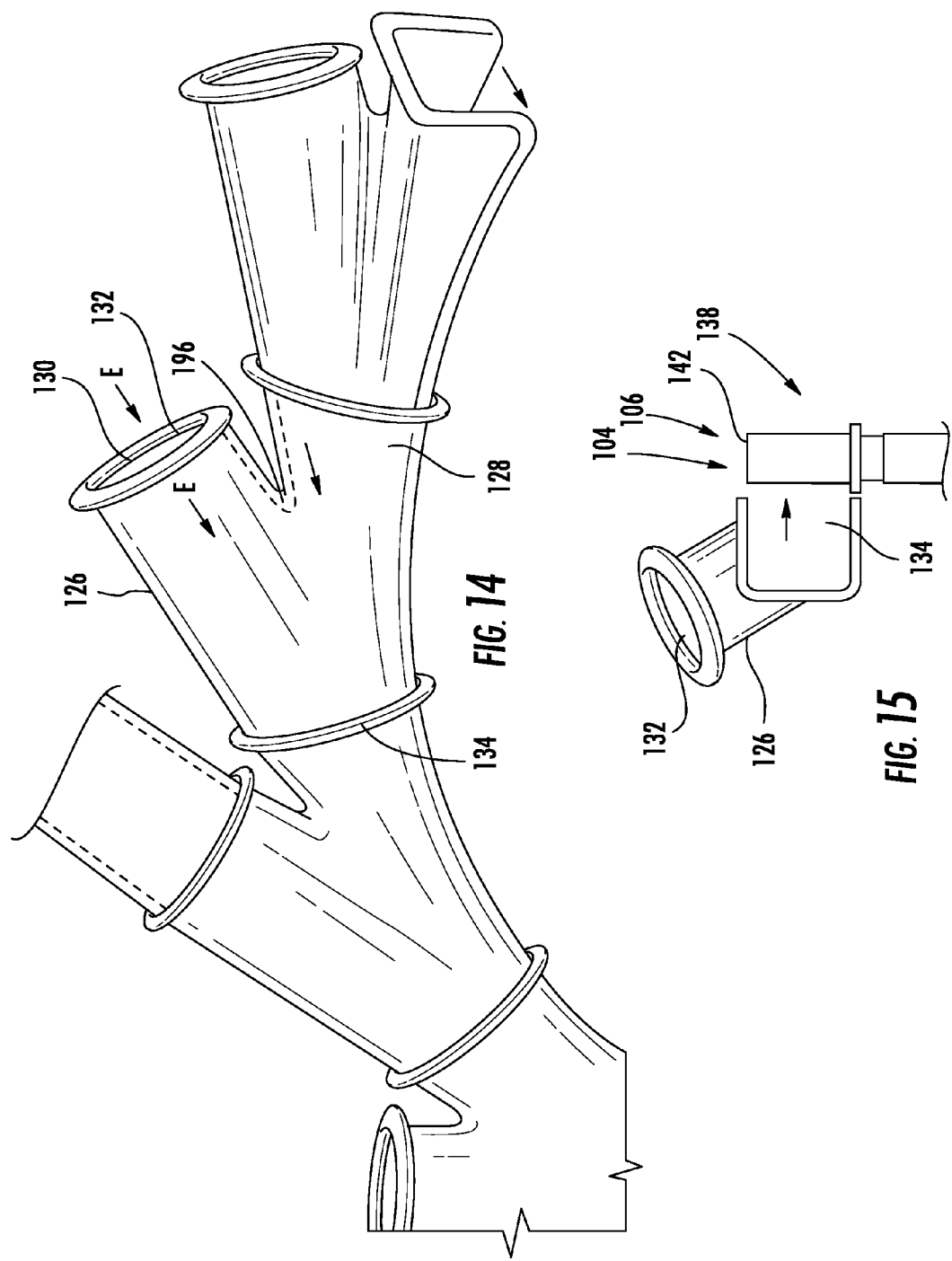

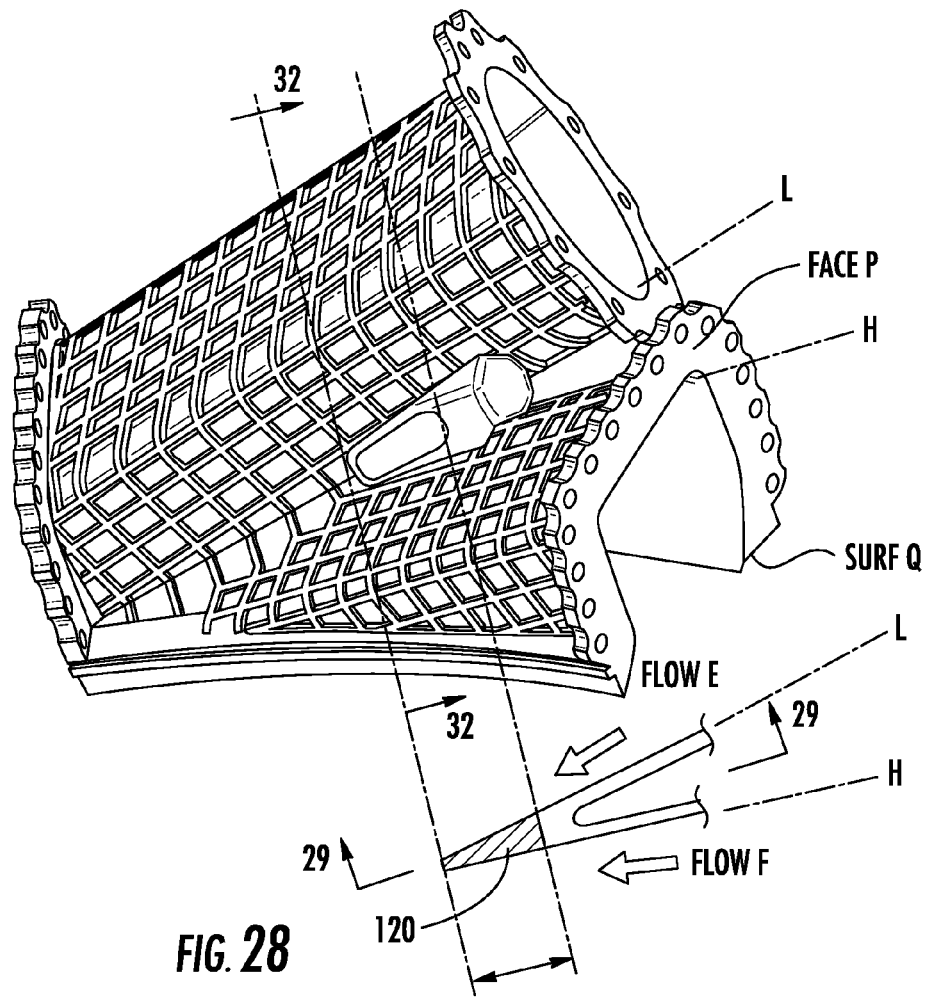
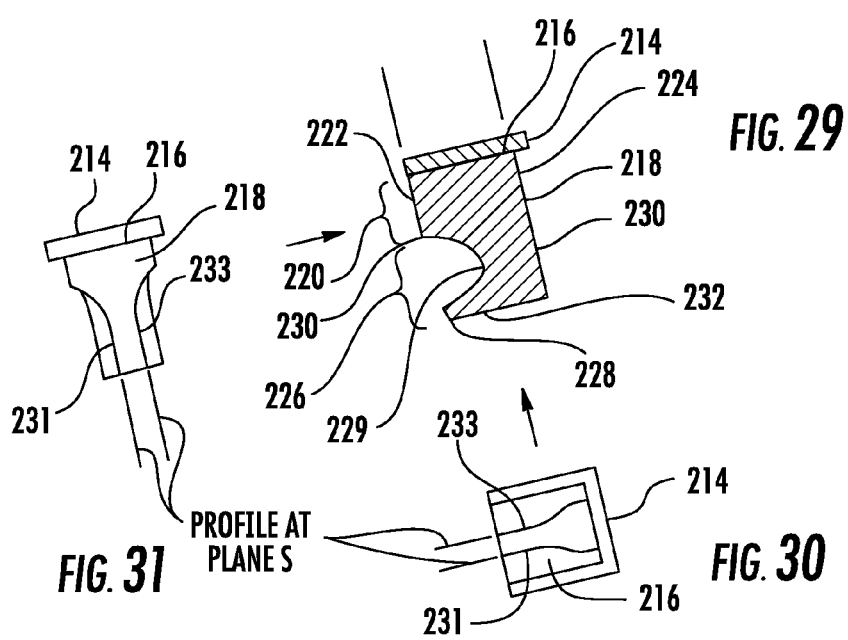

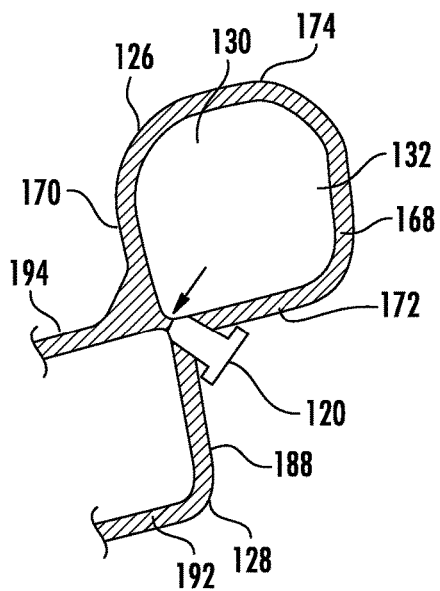
FIG. 32
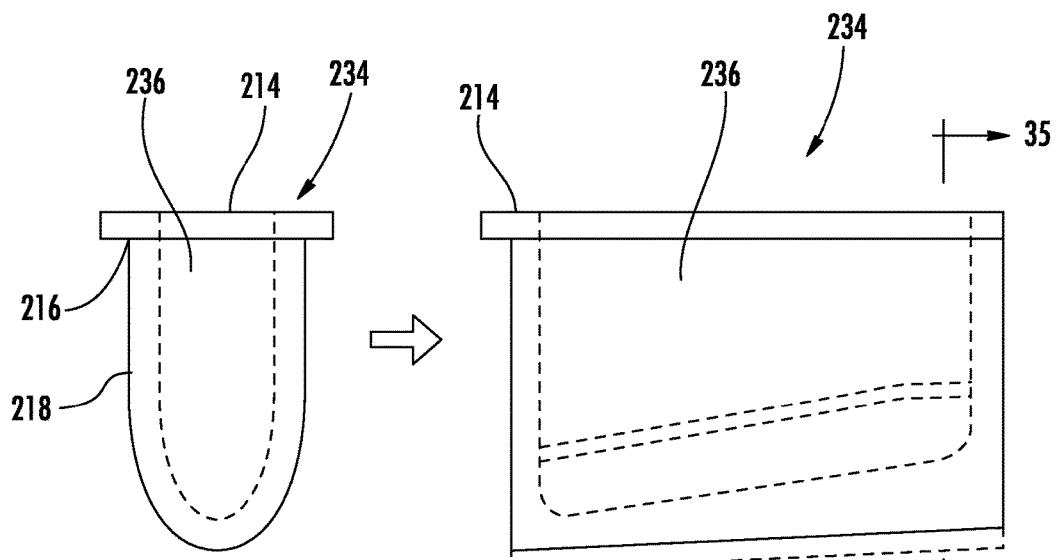
FIG. 34
FIG. 33

US 9,803,487 B2

CONVERGING FLOW JOINT INSERT SYSTEM AT AN INTERSECTION BETWEEN ADJACENT TRANSITIONS EXTENDING BETWEEN A COMBUSTOR AND A TURBINE ASSEMBLY IN A GAS TURBINE ENGINE

STATEMENT REGARDING FEDERALLY SPONSORED RESEARCH OR DEVELOPMENT

Development of this invention was supported in part by the United States Department of Energy, Advanced Turbine Development Program, Contract No. DE-FC26-05NT42644. Accordingly, the United States Government may have certain rights in this invention.

FIELD OF THE INVENTION

This invention is directed generally to gas turbine engines, and more particularly to transition ducts for routing gas flow from combustors to the turbine section of gas turbine engines.

BACKGROUND OF THE INVENTION

In conventional gas turbine engines, as shown in FIG. 1, combustion gases created within a combustor 10 are passed to a turbine assembly via a plurality of transition ducts 12. In many conventional systems, the transition ducts 12 extended longitudinally without any offset in a circumferential direction. A row of first stage vanes 14 were used to turn the combustion exhaust gases before being passed to the row one turbine blades 16. The use of first stage vanes 14 in a turbine assembly to accelerate and turn the longitudinal combustor exhaust gas flow in the circumferential direction presented several challenges. The vanes 14 and the associated vane support structures were required to have high strength characteristics to withstand the forces generated in changing the direction of extremely hot, high pressure gas flow over a substantial angle in a relatively short distance. The temperature of the gas flow and the heat generated by this turning process also require a vane cooling system. The forces and heat involved diminished material properties causing cracks to develop and otherwise damage the vanes and associated support structures.

To accommodate these operating conditions and to provide a more robust design, as shown in FIGS. 2-10, the transition ducts 20 directing combustion gases from a combustor 22 to a turbine assembly 24 were skewed circumferentially such that the outlets 26 of the transition ducts 20 were skewed circumferentially in the same direction that the first row turbine vanes would otherwise skew the combustion exhaust gases. As such, row one turbine vanes were no longer needed because the exhaust gases emitted from the transition ducts 20 already included the correct circumferential vector, thereby eliminating the need for the row one turbine vanes. As shown in U.S. Pat. No. 8,113,003, filing date Aug. 12, 2008, issuance date Feb. 14, 2012, which is incorporated herein in its entirety, the outlet of each transition duct is skewed in the circumferential direction relative to the inlet of each transition duct. While the transition duct system of the U.S. Pat. No. 8,113,003 has eliminated the need for row one turbine vanes upstream of row one turbine blades within a turbine assembly, there exists a need to increase the useful life of the skewed transition duct system by eliminating areas of high stress, which are shown in FIGS. 6-10.

SUMMARY OF THE INVENTION

A transition duct system for routing a gas flow from a combustor to the first stage of a turbine section in a combustion turbine engine, wherein the transition duct system includes one or more converging flow joint inserts forming a trailing edge at an intersection between adjacent transition duct is disclosed. The transition duct system may include a transition duct having an internal passage extending between an inlet to an outlet and may expel gases into the first stage turbine with a tangential component. The converging flow joint insert may be contained within a converging flow joint insert receiver and disconnected from the transition duct bodies by which the converging flow joint insert is positioned. Being disconnected eliminates stress formation within the converging flow joint insert, thereby enhancing the life of the insert. The converging flow joint insert may be removable such that the insert can be replaced once worn beyond design limits.

For a better understanding of the invention, a coordinate system can be applied to such a turbine system to assist in the description of the relative location of components in the system and movement within the system. The axis of rotation of the rotor assembly extends longitudinally through the compressor section, the combustion section and the turbine section and defines a longitudinal direction. Viewed from the perspective of the general operational flow pattern through the various sections, the turbine components can be described as being located longitudinally upstream or downstream relative to each other. For example, the compressor section is longitudinally upstream of the combustion section and the turbine section is longitudinally downstream of the combustion section. The location of the various components away from the central rotor axis or other longitudinal axis can be described in a radial direction. Thus, for example, the blade extends in a radial direction, or radially, from the rotor disc. Locations further away from a longitudinal axis, such as the central rotor axis, can be described as radially outward or outboard compared to closer locations that are radially inward or inboard.

The third coordinate direction—a circumferential direction—can describe the location of a particular component with reference to an imaginary circle around a longitudinal axis, such as the central axis of the rotor assembly. For example, looking longitudinally downstream at an array of turbine blades in a turbine engine, one would see each of the blades extending radially outwardly in several radial directions. Thus, the radial direction can describe the size of the reference circle and the circumferential direction can describe the angular location on the reference circle.

In at least one embodiment, the transition duct system routes gas flow in a combustion turbine subsystem that includes a first stage blade array having a plurality of blades extending in a radial direction from a rotor assembly for rotation in a circumferential direction, whereby the circumferential direction may have a tangential direction component. The combustion turbine subsystem may have an axis of the rotor assembly defining a longitudinal direction and at least one combustor located longitudinally upstream of the first stage blade array and located radially outboard of the first stage blade array. The transition duct system may include a first transition duct body having an internal passage extending between an inlet and an outlet. The outlet of the first transition duct body may be offset from the inlet in the longitudinal direction and the tangential direction. The outlet of the first transition duct body may be formed from a radially outer side generally opposite to a radially inner side, and the radially outer and inner sides may be coupled together with opposed first and second side walls. The transition duct system may also include a second transition duct body having an internal passage extending between an inlet and an outlet. The outlet of the second transition duct body may be offset from the inlet in the longitudinal direction and the tangential direction. The outlet of the second transition duct body may be formed from a radially outer side generally opposite to a radially inner side, and the radially outer and inner sides may be coupled together with opposed first and second side walls. A first side of the first transition duct body may intersect with a second side of the second transition duct body forming a converging flow joint. The transition duct system may include a converging flow joint insert extending through an outer wall and positioned at a downstream end of the converging flow joint to form a trailing edge of the converging flow joint.

The converging flow joint insert may be formed from a body with a flange positioned at a first end of the insert to prevent the converging flow joint insert from being ingested into a turbine downstream of the transition duct system. The flange of the converging flow joint insert may have a larger cross-sectional area than the body of the converging flow joint insert. The body of the converging flow joint insert may include a first section with a uniform thickness from a first side to a second side opposite to the first side and a second section extending from the first section and forming an outer downstream tip of the converging flow joint insert. The second section may have a nonuniform thickness with a thickness at the outer downstream tip being less than a thickness at an upstream edge of the second section. The converging flow joint insert may be formed from a first side that forms an extension of the first side of the first transition duct body and a second side that forms an extension of the second side of the second transition duct body.

The transition duct system may include an internal cooling system within the converging flow joint insert. The internal cooling system may include one or more internal cooling chambers in fluid communication with one or more exhaust orifices extending from an inlet in the internal cooling chamber through an outer wall forming a second section of the converging flow joint insert. The second section may include an outer downstream tip of the converging flow joint insert, and an outlet of the exhaust orifice may be positioned at an outer surface of the at least one internal cooling chamber. in at least one embodiment, the at least one exhaust orifice may be a plurality of exhaust orifices extending from inlets in the internal cooling chamber through the outer wall forming the second section of the converging flow joint insert to outlets of the exhaust orifice positioned at the outer surface of the internal cooling chamber. The internal cooling system may include one or more impingement plates positioned in the internal cooling chamber and extending from a first side to a second side opposite to the first side forming the converging flow joint insert. The impingement plate may include one or a plurality of impingement orifices. The internal cooling system may include one or more internal cooling chambers having an internal volume less than one half of a volume of outer walls forming the converging flow joint insert.

The transition duct system may include one or more exhaust orifices extending from an inlet in the internal cooling chamber through an outer wall forming a first section of the converging flow joint insert. The first section may have a uniform thickness from a first side to a second side opposite to the first side. The transition duct system may include one or more exhaust orifices extending from an inlet in the internal cooling chamber through an outer wall forming a second section of the converging flow joint insert. The second section may extend from the first section and may form an outer downstream tip of the converging flow joint insert. The second section may have a nonuniform thickness with a thickness at the outer downstream tip being less than a thickness at an upstream edge of the second section.

The converging flow joint insert may be disconnected from the first side of the first transition duct body and the second side of the of the second transition duct body, which eliminates mechanical stress within the converging flow joint insert. The converging flow joint insert may be removably attached within the transition duct system. The transition duct system may include a converging flow joint insert receiver positioned at the converging flow joint and configured to receive the converging flow joint insert. The converging flow joint insert receiver may include one or more inner walls defining one or more insert receiving orifices. The converging flow joint insert receiver may provide support to the converging flow joint insert and may include at least one flange contact surface configured to support a flange positioned at a first end of the insert to prevent the converging flow joint insert from being ingested into a turbine downstream of the transition duct system.

In at least one embodiment, a first side wall of the first transition duct body may be configured to be coplanar with a second side wall of the second transition duct body when assembled beside the first transition duct body. Longitudinal axes of the first and second transition duct bodies may be offset from each other in the circumferential direction.

An advantage of the transition duct system is that the converging flow joint insert replaces an area of high mechanical stress within transition duct systems with a converging flow joint insert that resides within a converging flow joint insert receiver and is exposed to minimal and possibly no mechanical stress.

Another advantage of the transition duct system is that the converging flow joint insert removes the sharp narrow geometry and the resulting stress concentrations from the converging flow joint between adjacent transition ducts and incorporates the sharp narrow geometry into the converging flow joint insert.

Yet another advantage of the transition duct system is that the converging flow joint insert is removable and replaceable, thereby enabling the converging flow joint insert to be replaced when worn due to erosion from high velocity gases.

Another advantage of the transition duct system is that the converging flow joint insert is supported by a converging flow joint insert receiver that is formed from a buildup of material at the intersection of sidewalls proximate to outlets of adjacent transition ducts that increase the strength of the walls so they can better resist the pressure loading and distributing the stresses over a larger area, thereby reducing the stress levels and increasing the design life of the transition duct system.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

FIG. 14 is a perspective view of a plurality of transition ducts coupled together immediately upstream of row one turbine blades.

FIG. 15 is a simplified side view of a transition duct shown in FIG. 10.

FIG. 28 is a cross-sectional, top view of the converging flow joint insert taken along section lines 28-28 in FIG. 23, as shown relative to a perspective view of external surfaces of two adjacent transition ducts at their downstream ends, which are coupled together and including a converging flow joint insert positioned within a converging flow joint insert receiver at an intersection between two adjacent transition ducts.

FIG. 29 is a cross-sectional side view of the converging flow joint insert taken along section line 29-29 in FIG. 28.

FIG. 30 is a bottom view of the converging flow joint insert shown in FIG. 29.

FIG. 31 is a front view of the converging flow joint insert shown in FIG. 29.

FIG. 32 is a cross-sectional view of the converging flow joint insert positioned within a converging flow joint insert receiver at an intersection between two adjacent transition ducts taken along section line 32-32 in FIG. 28.

FIG. 33 is a cross-sectional side view of the converging flow joint insert with an internal cooling system together with alternative outer surface locations showing possible alternative positions of the outer surface in other embodiments.

FIG. 34 is an upstream end view of the converging flow joint insert of FIG. 33.

DETAILED DESCRIPTION OF EMBODIMENTS OF THE INVENTION

Figure 1:
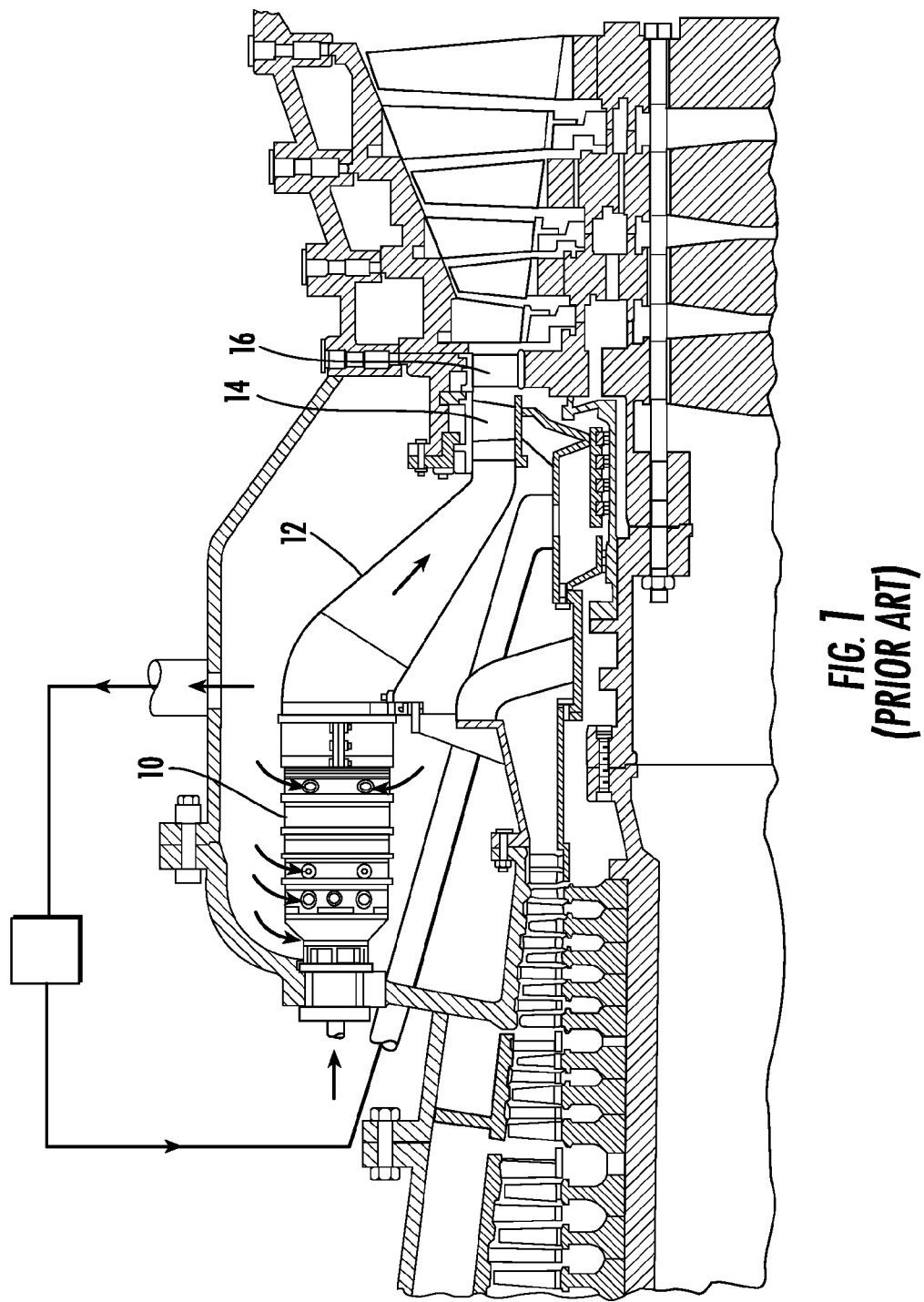
FIG. 1 is a cross-sectional view of a portion of a gas turbine engine.
Figure 2:
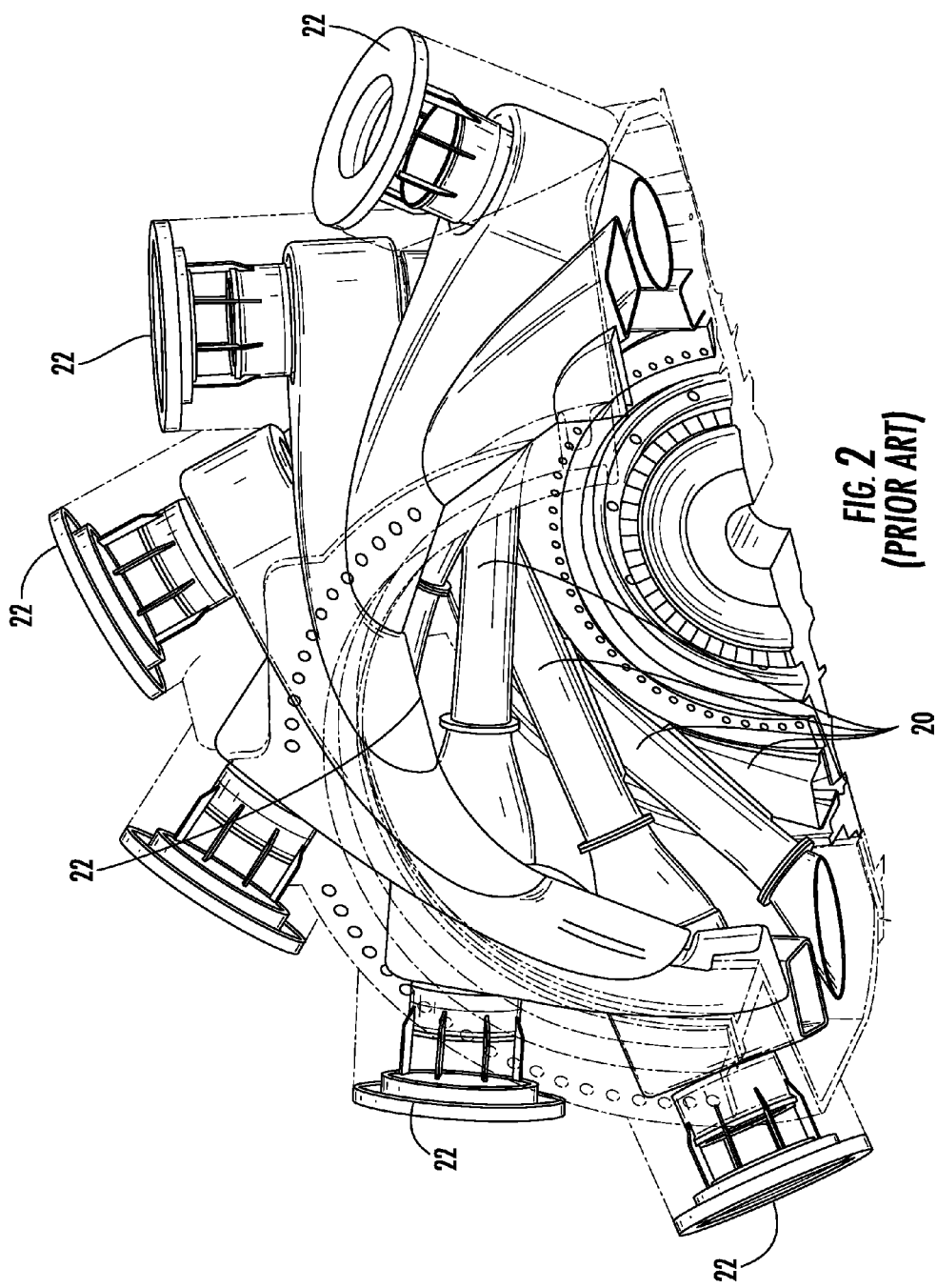
FIG. 2 is an downstream facing perspective view of an upper half of a plurality of can-annular combustors coupled to transition ducts.
Figure 3:
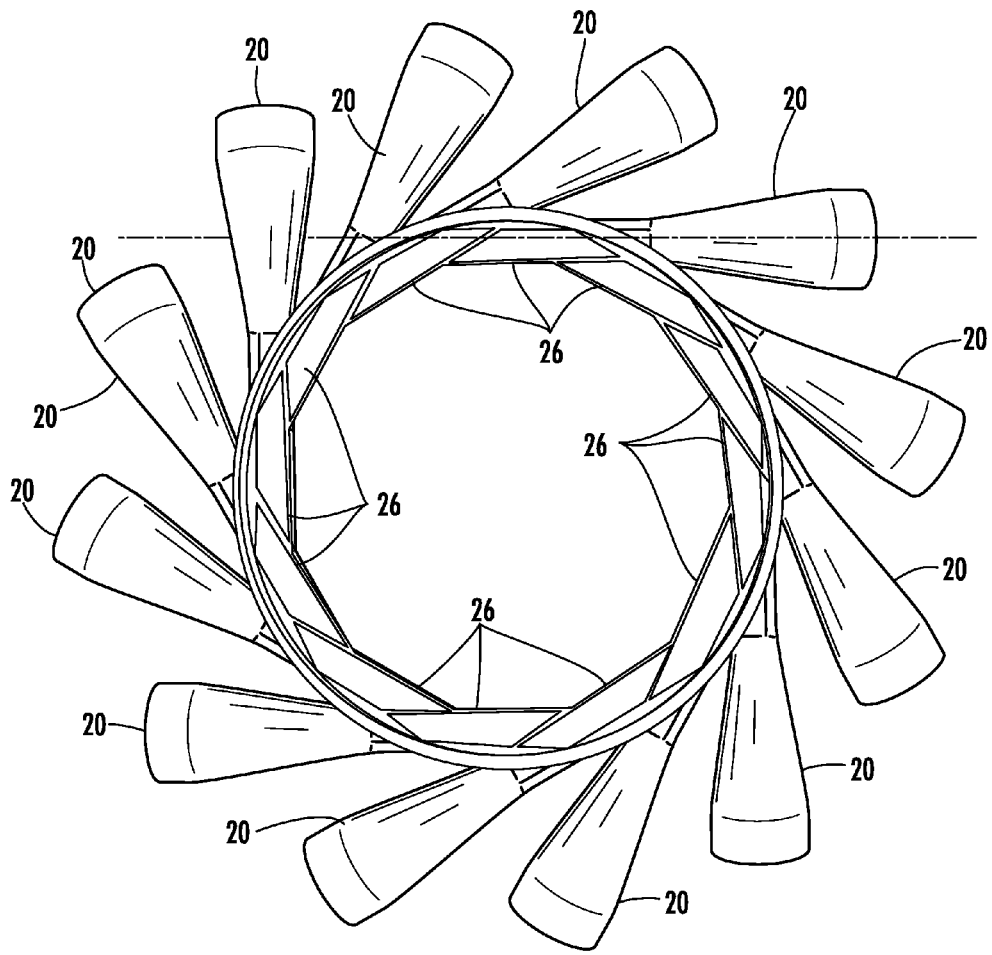
FIG. 3 is an upstream longitudinal view of a circular array of transition ducts.
Figure 4:
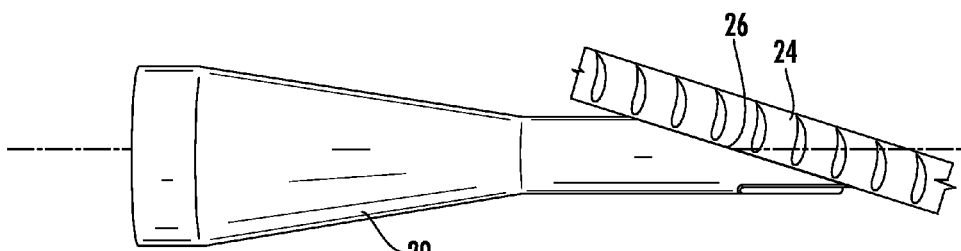
FIG. 4 is a side view of a transition duct relative to row one turbine blades.
Figure 5:
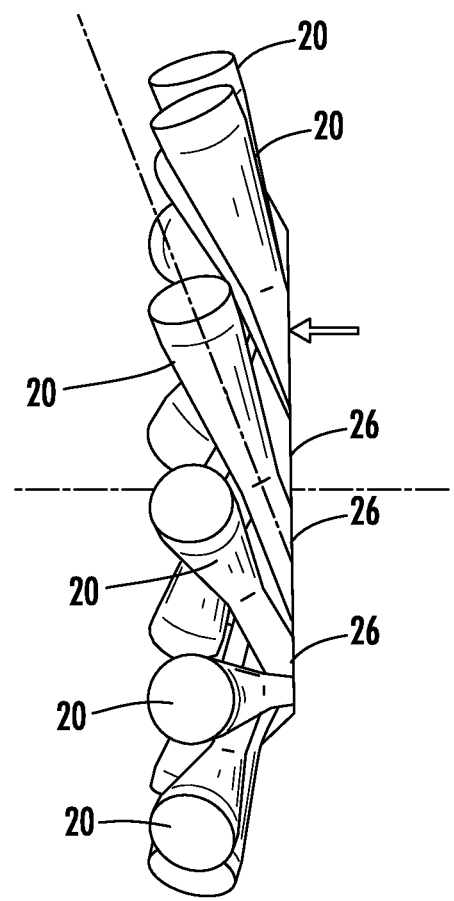
FIG. 5 is a top view of a circular array of transition ducts.
Figure 6:
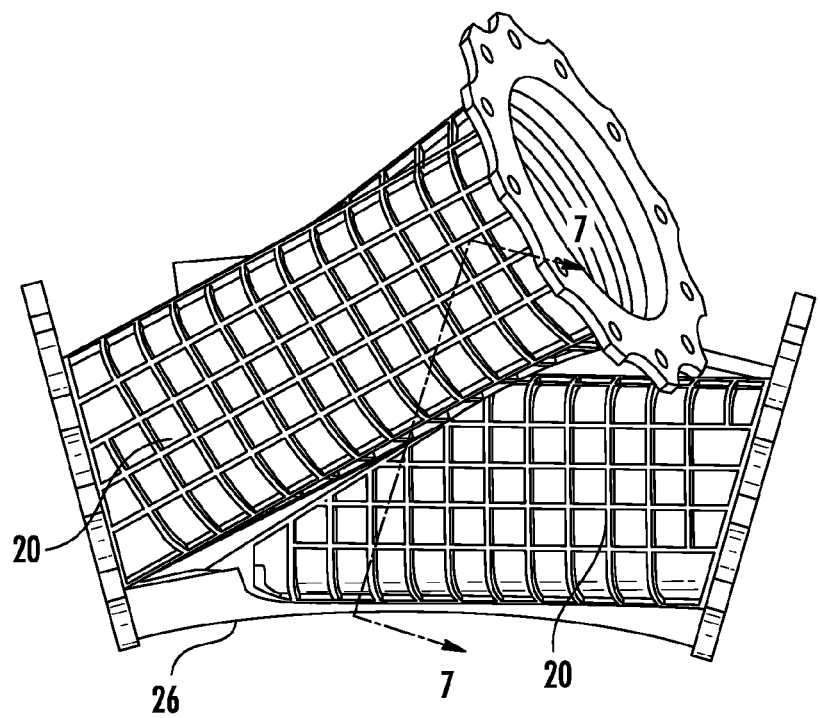
FIG. 6 is a top view of a fitting in which two adjacent transition ducts are positioned.
Figure 7:
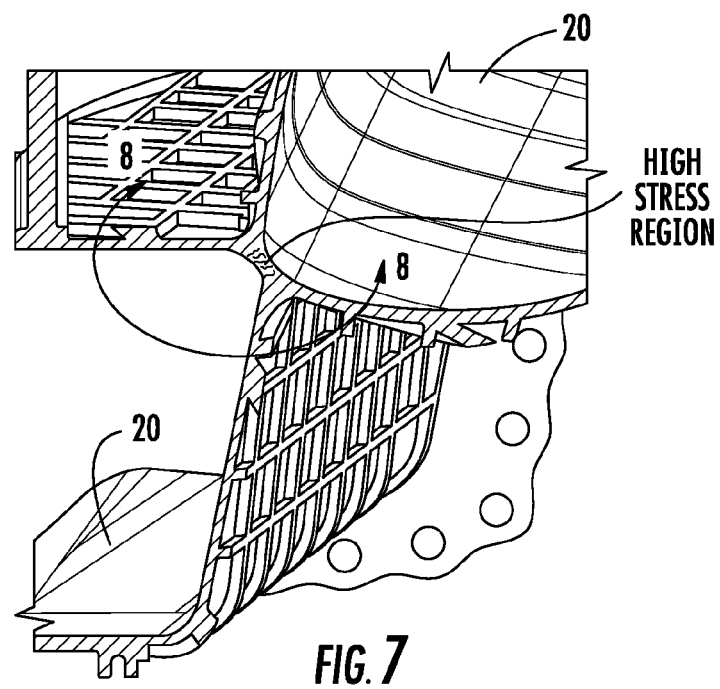
FIG. 7 is a cross-sectional view of the two adjacent transition ducts of FIG. 6 taken along section line 7-7 in FIG. 6 in which an area of high mechanical stress is identified.
Figure 8:
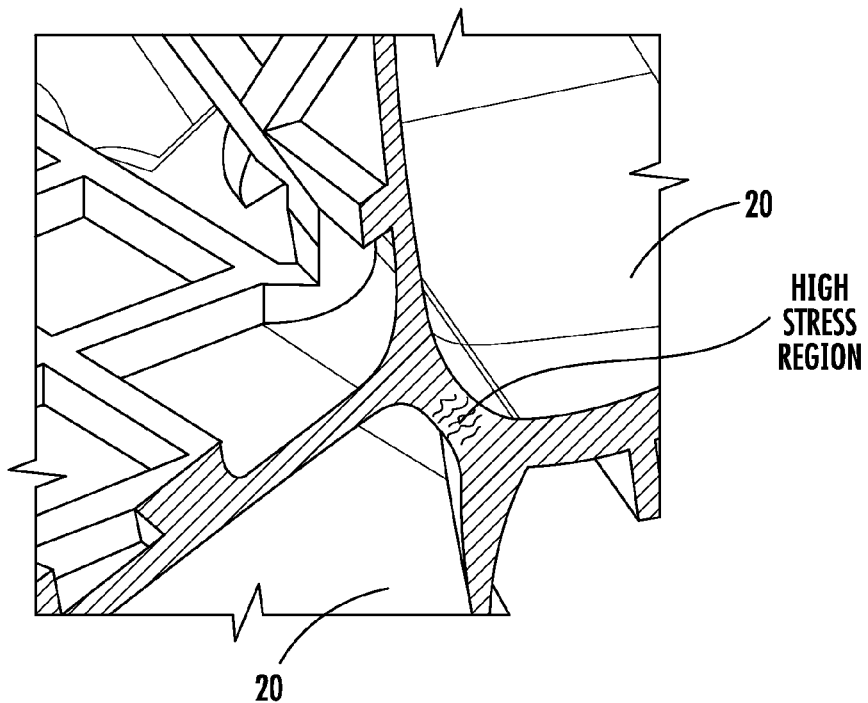
FIG. 8 is a perspective detailed view of the area of high mechanical stress at the intersection between the adjacent transition ducts taken along detail line 8-8 in FIG. 7.
Figure 9:
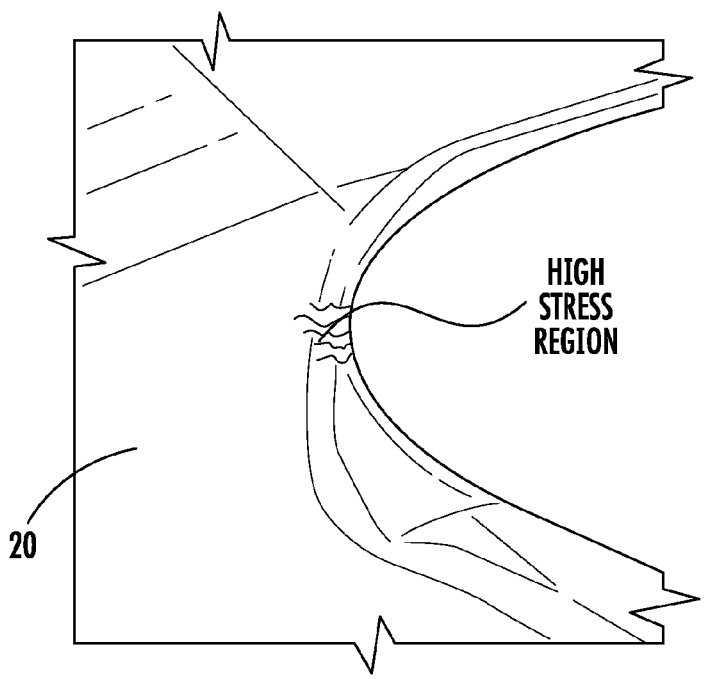
FIG. 9 is another perspective view of the area of high mechanical stress at the intersection between the adjacent transition ducts taken along detail line 8-8 shown in FIG. 7.
Figure 10:
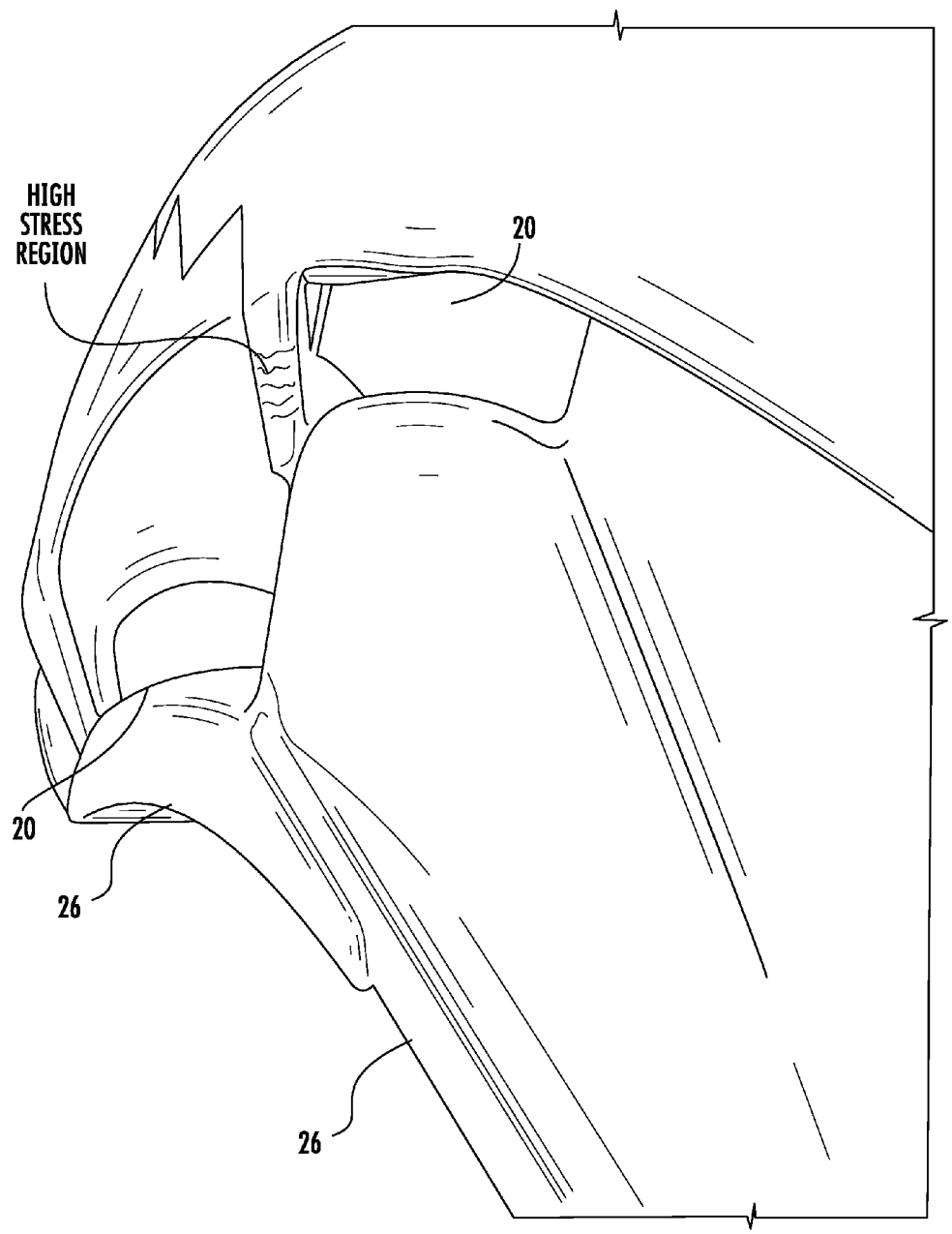
FIG. 10 is a partial perspective view of two transition ducts looking upstream into the internal passageways of the transition ducts showing how the adjacent transition ducts next together at the exhaust outlets.
Figure 11:
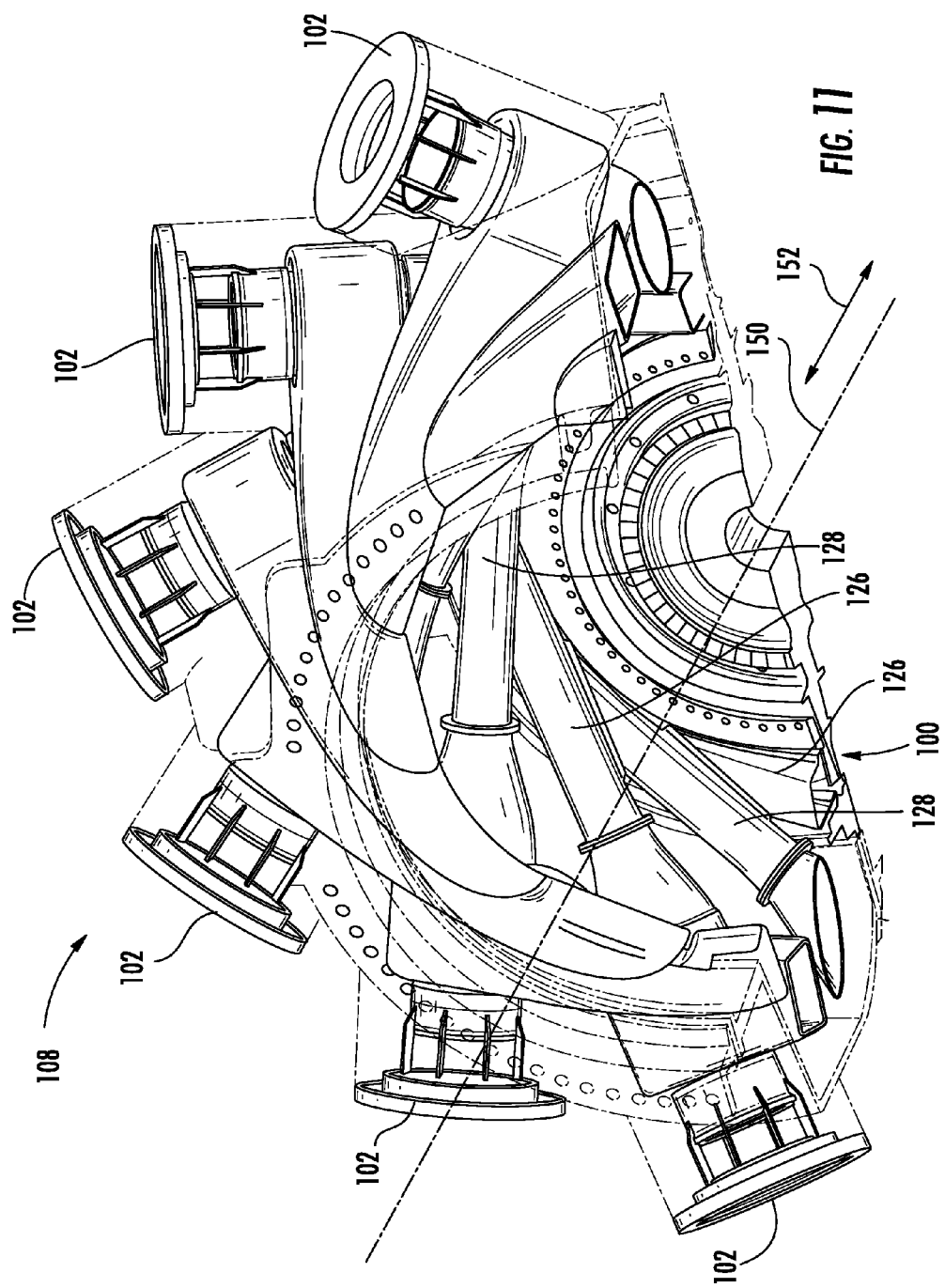
FIG. 11 is an downstream facing perspective view of an upper half of a plurality of can-annular combustors coupled to transition ducts.
Figure 12:
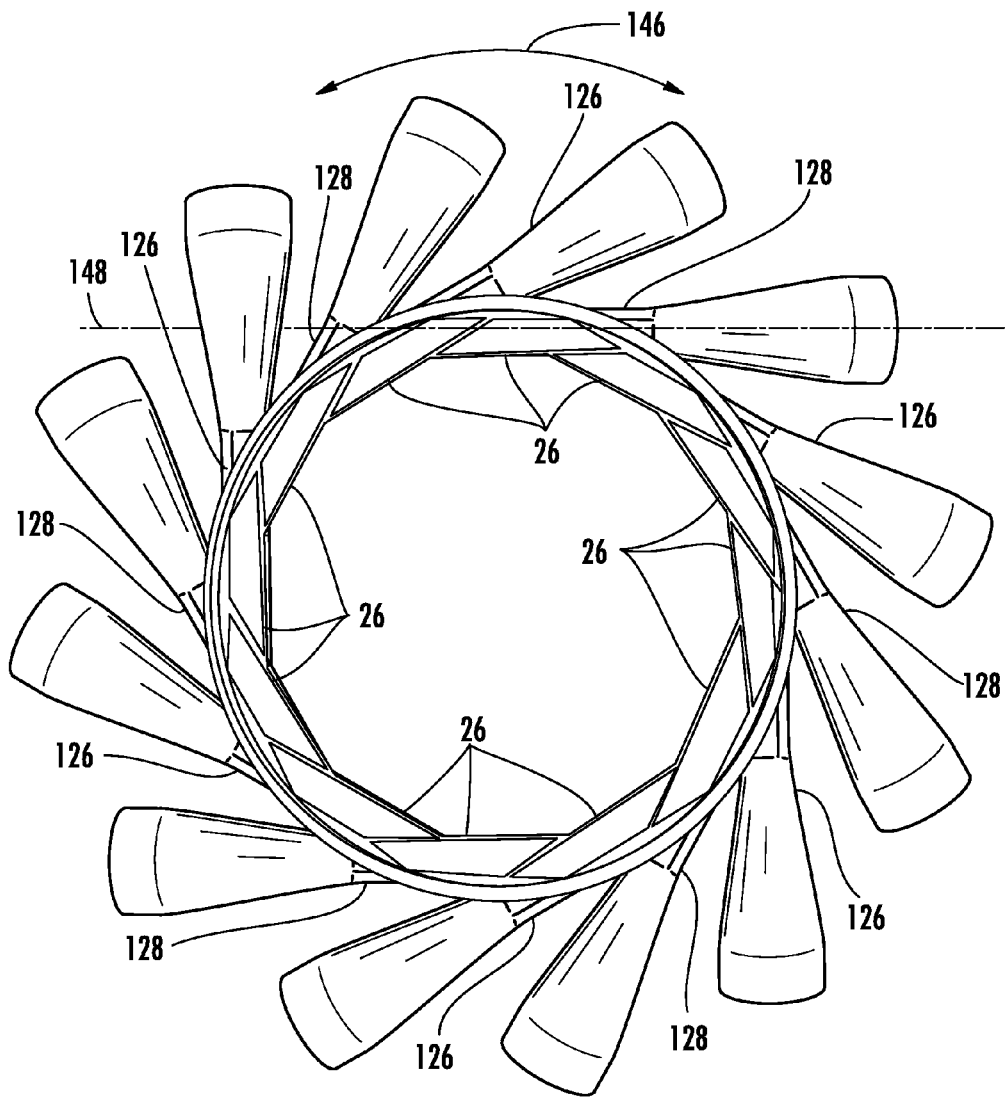
FIG. 12 is an upstream longitudinal view of a circular array of transition ducts.
Figure 13:
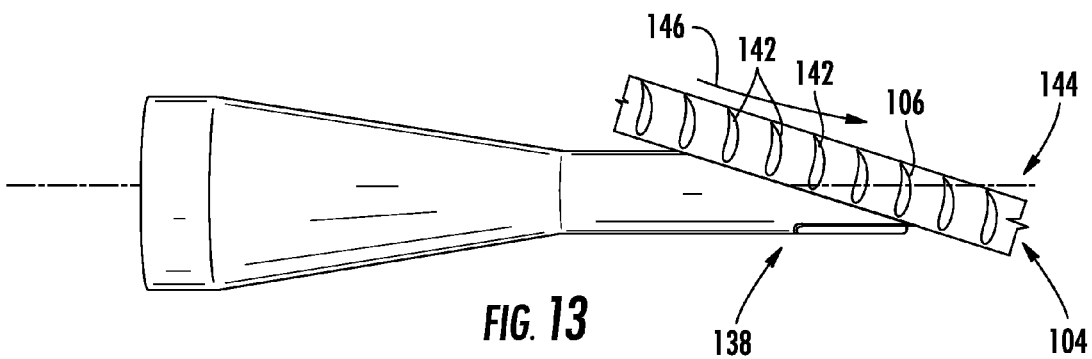
FIG. 13 is a side view of a transition duct relative to row one turbine blades.
Figure 16:
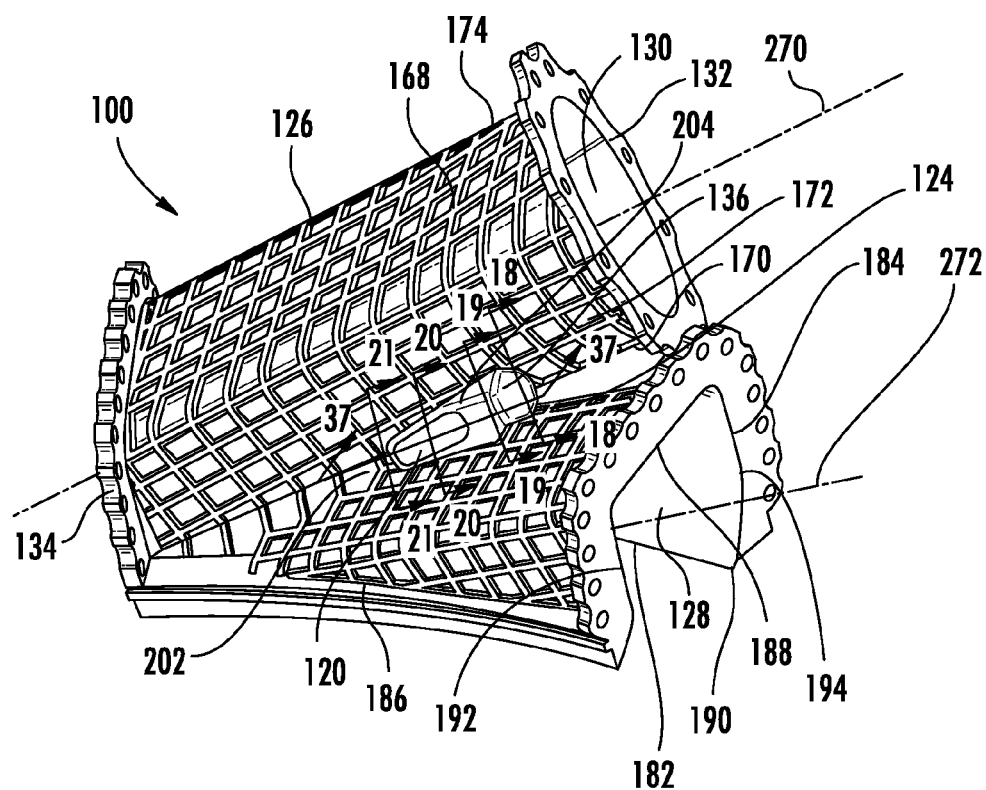
FIG. 16 is a perspective view of external surfaces of two adjacent transition ducts at their downstream ends, which are coupled together and including a converging flow joint insert positioned within a converging flow joint insert receiver at an intersection between two adjacent transition ducts.
Figure 17:
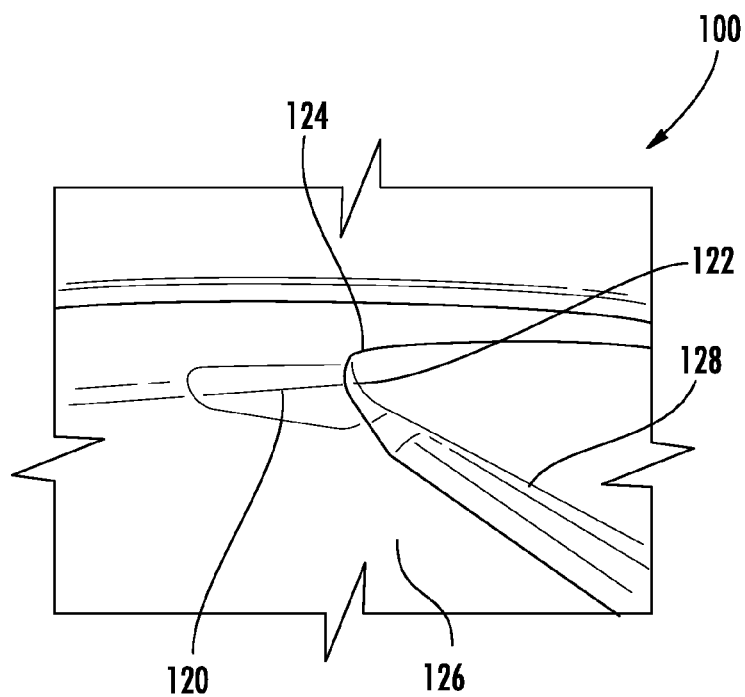
FIG. 17 is a perspective view of the converging flow joint insert positioned within a converging flow joint insert receiver at an intersection between two adjacent transition ducts.
Figures 18, 19:
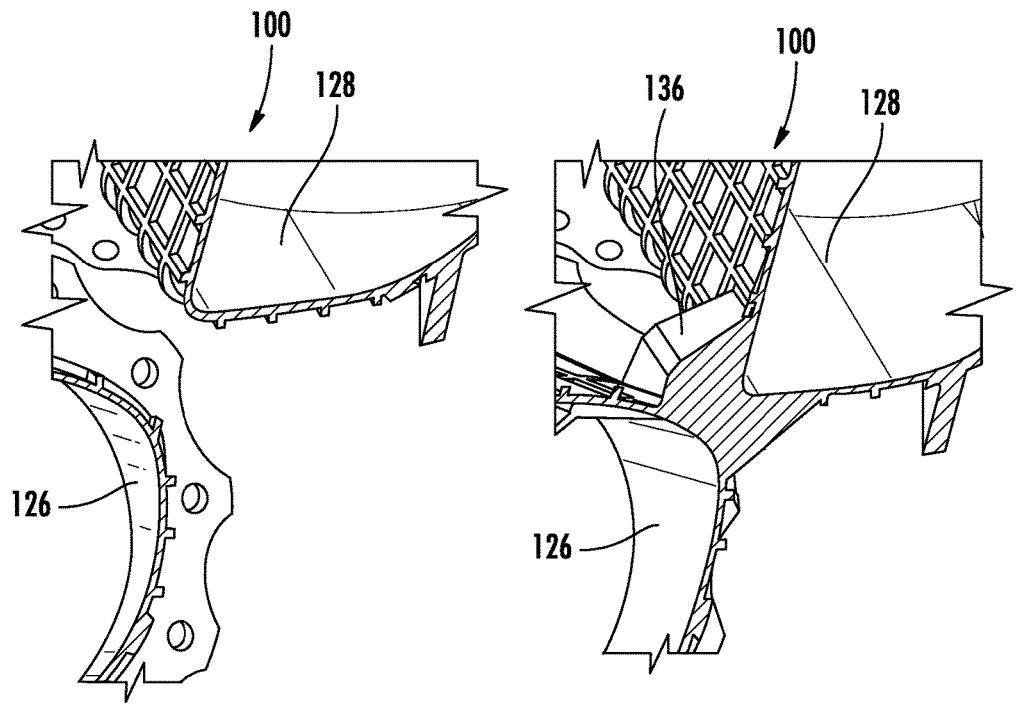
FIG. 18 is a cross-sectional view of the converging flow joint between two adjacent transition ducts taken at section line 18-18 in FIG. 16.
FIG. 19 is a cross-sectional view of the converging flow joint between two adjacent transition ducts taken at section line 19-19 in FIG. 16.

As shown in FIGS. 11-46, a transition duct system 100 for routing a gas flow from a combustor 102 to the first stage 104 of a turbine section 106 in a combustion turbine engine 108, wherein the transition duct system 100 includes one or more converging flow joint inserts 120 forming a trailing edge 122 at an intersection 124 between adjacent transition duct 126, 128 is disclosed. The transition duct system 100 may include a transition duct 126 having an internal passage 130 extending between an inlet 132 to an outlet 134 and may expel gases into the first stage turbine 104 with a tangential component. The converging flow joint insert 120 may be contained within a converging flow joint insert receiver 136 and disconnected from the transition duct bodies 126, 128 by which the converging flow joint insert 120 is positioned. Being disconnected on side surfaces eliminates stress formation within the converging flow joint insert 120, thereby enhancing the life of the insert 120. The converging flow joint insert 120 may be removable such that the insert 120 can be replaced once worn beyond design limits.

In at least one embodiment, the transition duct system 100 may route gas flow in a combustion turbine subsystem 138 that includes a first stage blade array 104 having a plurality of blades 142 extending in a radial direction from a rotor assembly 144 for rotation in a circumferential direction 146, whereby the circumferential direction 146 may have a tangential direction component 148. The combustion turbine subsystem 138 may also include an axis 150 of the rotor assembly 144 defining a longitudinal direction 152, and at least one combustor 102 located longitudinally upstream of the first stage blade array 104 and located radially outboard of the first stage blade array 104.

The transition duct system 100 may include a plurality of transition ducts 126, 128 coupled together such that the ducts 126, 128 exhaust combustion gases in a downstream direction together with a tangential component 148, thereby eliminating the need for a first stage turbine vane row upstream from a first turbine blade row, as found in convention gas turbine engines. In particular, the transition duct system 100 may include a first transition duct body 126 having an internal passage 130 extending between an inlet 132 and an outlet 134. The outlet 134 of the first transition duct body 134 is offset from the inlet 132 in the longitudinal direction 152 and the tangential direction 148. The outlet 134 of the first transition duct body 126 may be formed from a radially outer side 168 generally opposite to a radially inner side 170, and the radially outer and inner sides 168, 170 may be coupled together with opposed first and second side walls 172, 174.

The transition duct system 100 may include a second transition duct body 128 having an internal passage 182 extending between an inlet 184 and an outlet 186. The outlet 186 of the second transition duct body 128 may be offset from the inlet 184 in the longitudinal direction 152 and the tangential direction 148. The outlet 186 of the second transition duct body 128 may be formed from a radially outer side 188 generally opposite to a radially inner side 190, and the radially outer and inner sides 188, 190 may be coupled together with opposed first and second side walls 192, 194. When the first transition duct 126 is positioned next to the second transition duct body 128, a first side wall 172 of the first transition duct body 126 intersects with a second side wall 194 of the second transition duct body 128 forming a converging flow joint 196. In at least one embodiment, the first side wall 172 of the first transition duct body 126 may be configured to be coplanar with a second side wall 194 of the second transition duct body 128 when assembled beside the first transition duct body 126. Longitudinal axes 270, 272 of the first and second transition duct bodies 126, 128 may be offset from each other in the circumferential direction 146.

The transition duct system 100 may also include a converging flow joint insert 120 extending through an outer wall 202 and positioned at a downstream end 204 of the converging flow joint 196 to form the trailing edge 122 of the converging flow joint 196. The converging flow joint insert 120 is positioned in a location of high mechanical stress in conventional systems. The converging flow joint insert 120 may be disconnected from the first side 172 of the first transition duct body 126 and the second side 194 of the of the second transition duct body 128. Being disconnected, yet positioned to act as the trailing edge 122 of the converging flow joint 196 enables the converging flow joint insert 120 to function without being subjected to mechanical stress. The converging flow joint insert 120 may be contained within a converging flow joint insert receiver 136. The converging flow joint insert receiver 136 may be positioned at the converging flow joint 196 and configured to receive the converging flow joint insert 120. The converging flow joint insert receiver 136 may include one or more inner walls 208 defining at least one insert receiving orifice 210 that provides support to the converging flow joint insert 120, as shown in FIGS. 22-26. The converging flow joint insert receiver 136 may also include one or more flange contact surfaces 212 configured to support a flange 214, as shown in FIGS. 29-37, positioned at a first end 216 of the insert 120 to prevent the converging flow joint insert 120 from being ingested into a turbine downstream of the transition duct system 100. The converging flow joint insert 120 may be removably attached within the transition duct system 100. The converging flow joint insert 120 may be coupled to the converging flow joint insert receiver 136 via a weld or appropriate method already invented or yet to be invented.

The converging flow joint insert 120 may be formed from a body 218 with a flange 214 positioned at the first end 216 of the insert 120 to prevent the converging flow joint insert 120 from being ingested into a turbine downstream of the transition duct system 100. The flange 214 of the converging flow joint insert 120 may have a larger cross-sectional area than the body 218 of the converging flow joint insert 120. The converging flow joint insert 120 may be formed from a first side 260 that forms an extension of the first side wall 172 of the first transition duct body 126 and a second side 262 that forms an extension of the second side wall 194 of the second transition duct body 128. The flange 214 and the body 218 may be a unitary structure. In another embodiment, the flange 214 may be coupled to the body 218 via welding, brazing or other appropriate connection mechanism.

Figures 20, 21:
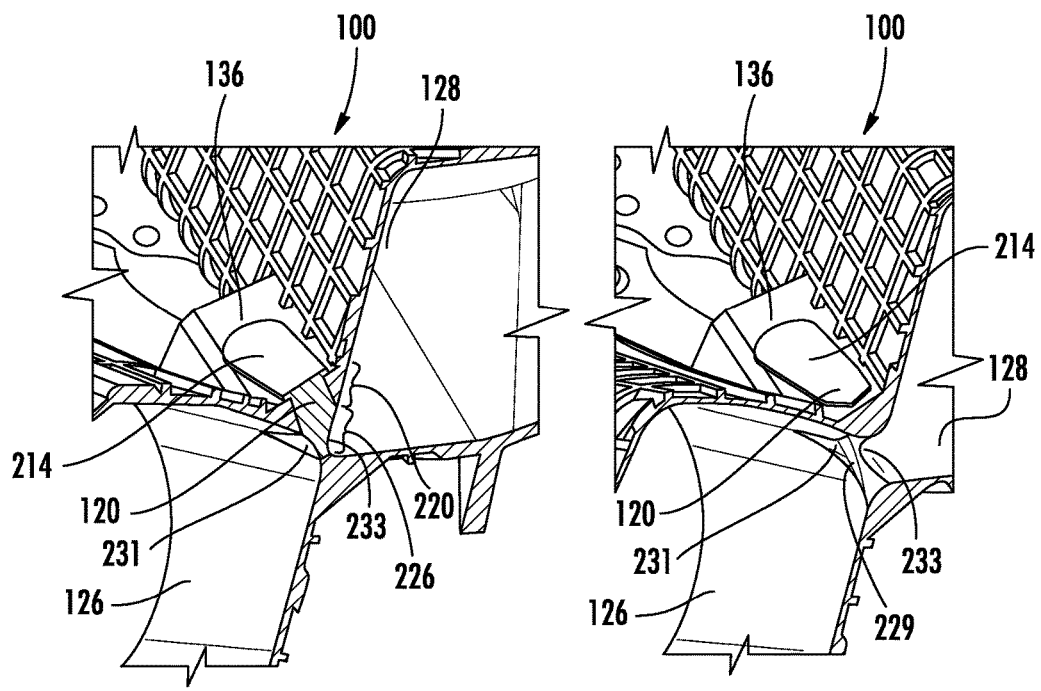
FIG. 20 is a cross-sectional view of the converging flow joint between two adjacent transition ducts taken at section line 20-20 in FIG. 16.
FIG. 21 is a cross-sectional view of the converging flow joint between two adjacent transition ducts taken at section line 21-21 in FIG. 16.
Figure 22:
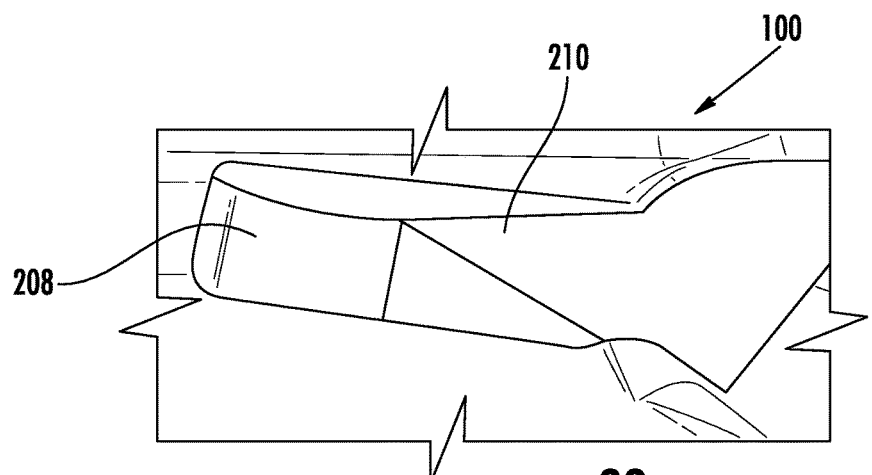
FIG. 22 is a perspective view of internal surfaces of a converging flow joint insert receiver at a converging flow joint between two adjacent transition ducts at their downstream ends, whereby the converging flow joint insert is not contained within the converging flow joint insert receiver.
Figure 23:
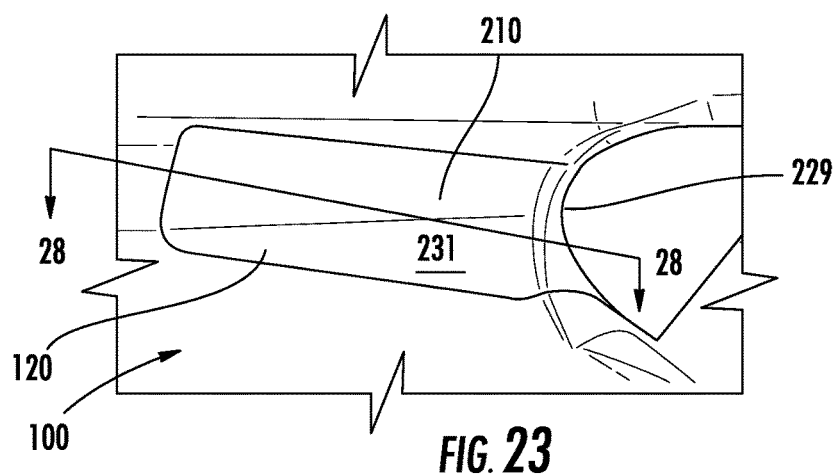
FIG. 23 is a perspective view of internal surfaces of a converging flow joint insert receiver at a converging flow joint between two adjacent transition ducts at their downstream ends with the converging flow joint insert positioned within the converging flow joint insert receiver.
Figure 24:
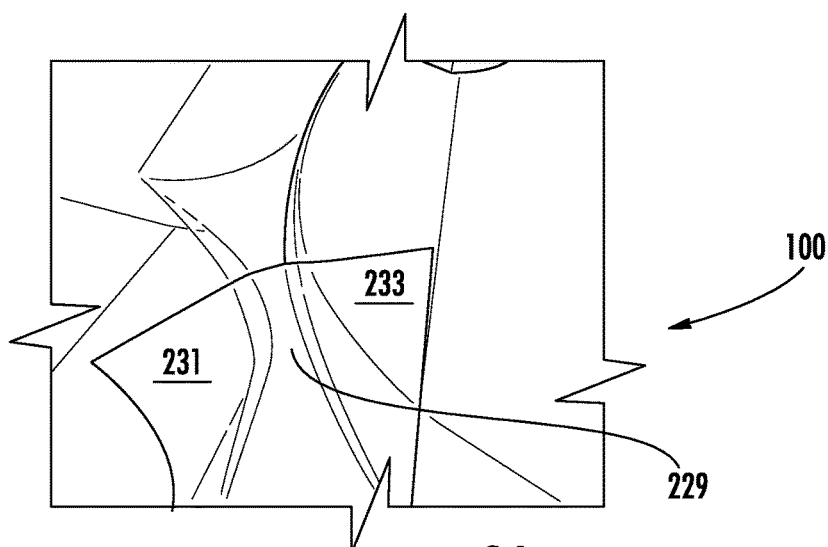
FIG. 24 is perspective view a converging flow joint insert at a different angle than in FIG. 23.
Figure 25:
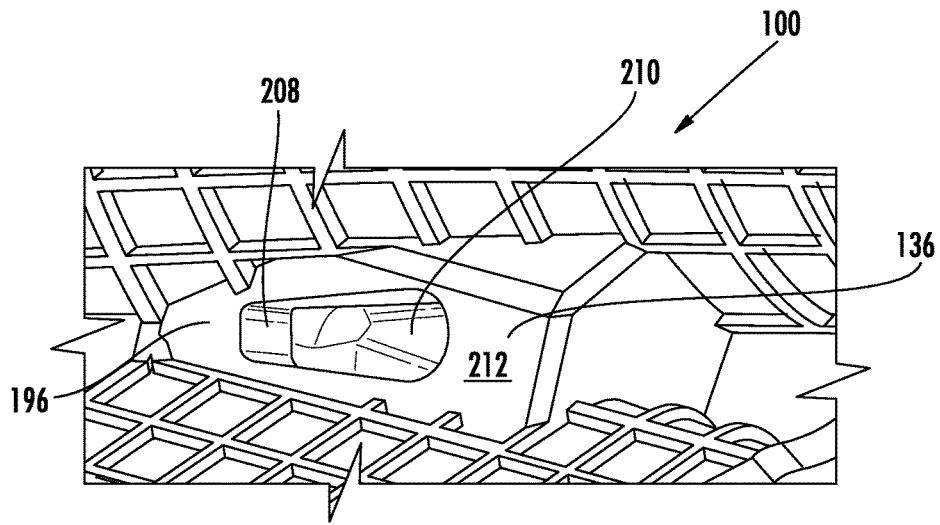
FIG. 25 is a perspective view of external surfaces of a converging flow joint insert receiver at a converging flow joint between two adjacent transition ducts at their downstream ends, whereby the converging flow joint insert is not contained within the converging flow joint insert receiver and a downstream internal surface of the converging flow joint insert receiver is displayed.
Figure 26:
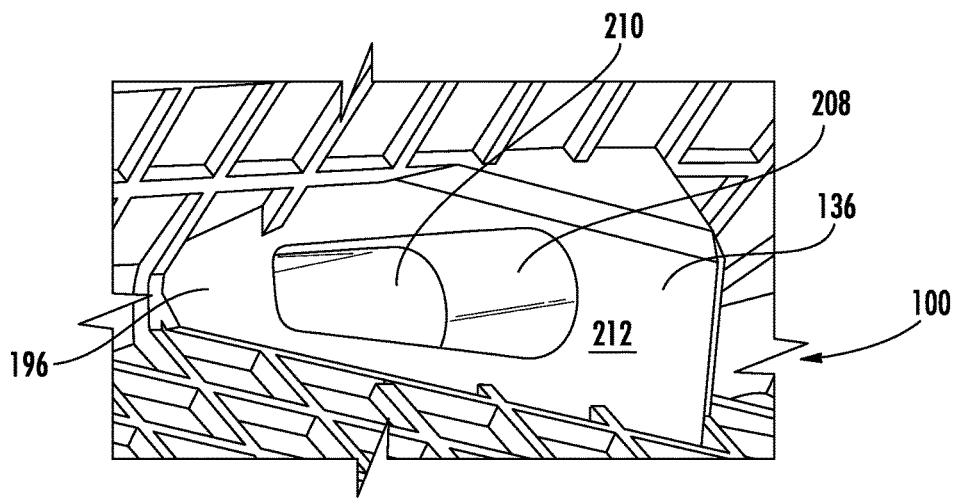
FIG. 26 is another perspective view of external surfaces of a converging flow joint insert receiver, taken from a different perspective than FIG. 25, at a converging flow joint between two adjacent transition ducts at their downstream ends, whereby the converging flow joint insert is not contained within the converging flow joint insert receiver and an upstream internal surface of the converging flow joint insert receiver is displayed.
Figure 27:
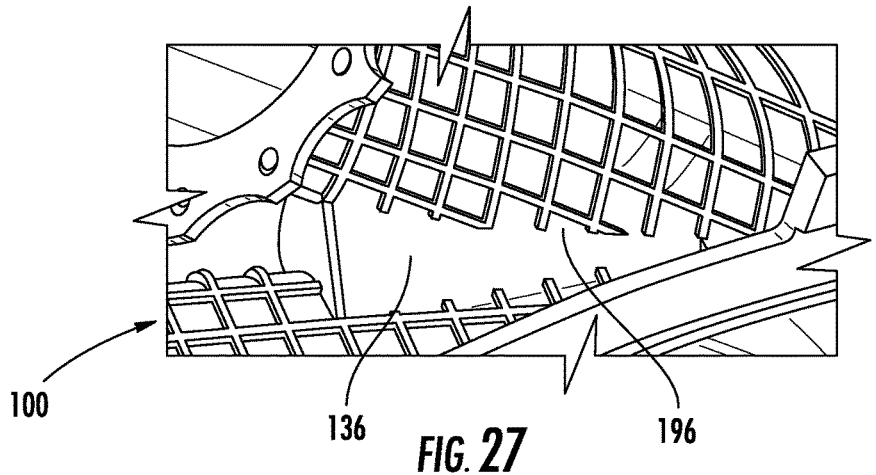
FIG. 27 is a perspective view of external surfaces of a non-insert side of the converging flow joint insert receiver at a converging flow joint between two adjacent transition ducts at their downstream ends.

The body 218 of the converging flow joint insert 120 may include a first section 220 with a uniform thickness from a first side 222 to a second side 224 opposite to the first side 222 and a second section 226 extending from the first section 220 and forming an outer downstream tip 228 of the converging flow joint insert 120. The second section 226 has a nonuniform thickness with a thickness at the outer downstream tip 228 being less than a thickness at an upstream edge 230. As shown in FIG. 20, the first section 220 of the converging flow joint insert 120 may be positioned closer to the converging flow joint insert receiver 136 than the second section 226. The second section 226 may include a first side 231 and a second side 233 that is on an opposite side from the first side 231. The first and second sides 231, 233 may have a somewhat convex surface that each replicate the inner surfaces of the first side wall 172 of the first transition duct body 126 and the second side wall 194 of the second transition duct body 128. The trailing edge 229 of the converging flow joint insert 120 may have a generally curved shape extending from the first section 220 towards a distal end 232 of the second section 226 to follow the contour of the intersection 124 between the first and second transition bodies 126, 128.

The converging flow joint insert 120 may include an internal cooling system 234 within the converging flow joint insert 120, as shown in FIGS. 33-36. The internal cooling system 234 may have any appropriate shape configured to adequately cool the converging flow joint insert 120 when extending into the hot gas path at the intersection 124 of the first and second transition ducts 126, 128. The internal cooling system 234 may include one or more internal cooling chambers 236 in fluid communication with one or more exhaust orifices 238 extending from an inlet 240 in the internal cooling chamber 236 through an outer wall 242 forming the second section 226 of the converging flow joint insert 120. The second section 226 may include an outer downstream tip 228 of the converging flow joint insert 120, and an outlet 244 of the at least one exhaust orifice 238 may be positioned at an outer surface 246 of the internal cooling chamber 236. In at least one embodiment, the internal cooling system 234 may include a plurality of exhaust orifices 238 extending from inlets 240 in the internal cooling chamber 236 through the outer wall 242 forming the second section 226 of the converging flow joint insert 120 to outlets 244 of the exhaust orifice 238 positioned at the outer surface 246 of the internal cooling chamber 236.

Figure 35:
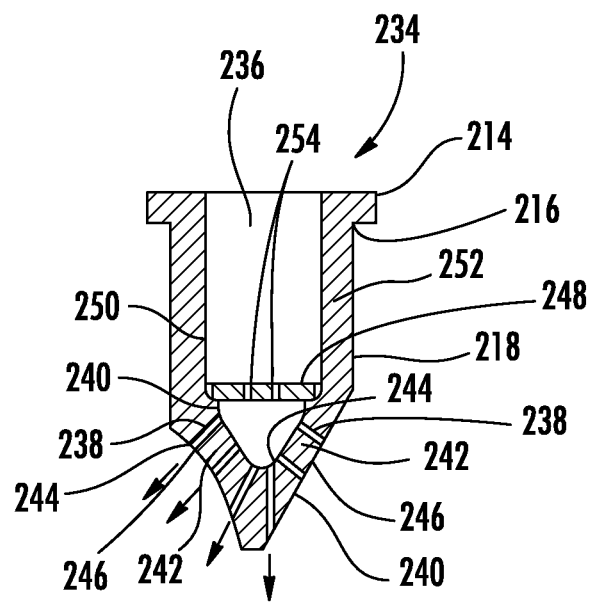
FIG. 35 is a cross-sectional view of the converging flow joint insert taken at section line 35-35 in FIG. 33.
Figure 36:
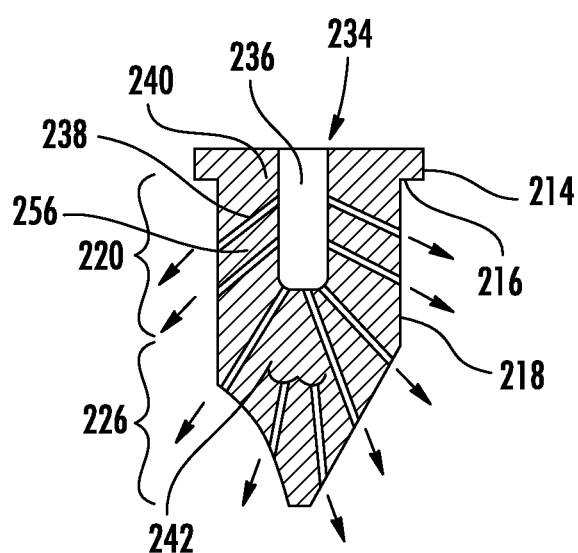
FIG. 36 is a cross-sectional view of another embodiment of the converging flow joint insert with a different internal cooling system configuration taken at section line 35-35 in FIG. 33.
Figure 37:
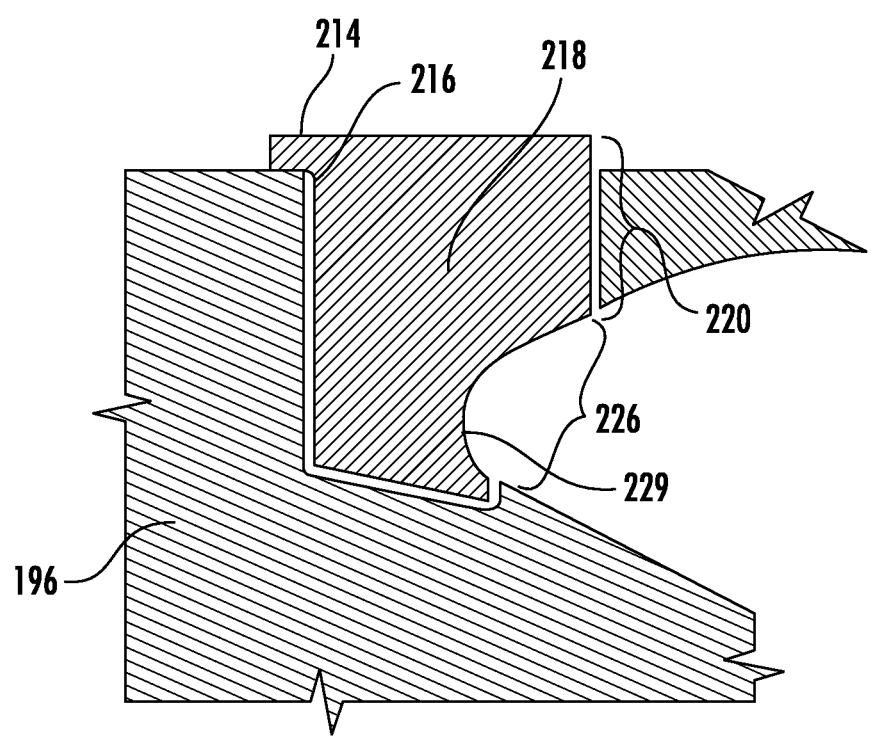
FIG. 37 is a cross-sectional view of the converging flow joint insert configuration taken at section line 37-37 in FIG. 16.
Figure 38:
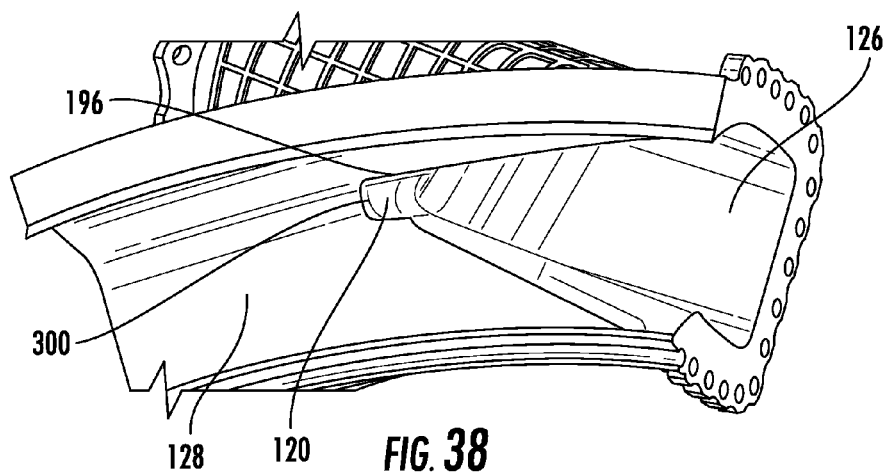
FIG. 38 is a perspective view of an alternative embodiment of internal surfaces of a converging flow joint insert receiver at a converging flow joint between two adjacent transition ducts at their downstream ends with an alternative embodiment of the converging flow joint insert positioned within a recess where the converging flow joint insert does not protrude through the outer wall defining the recess.
Figure 39:
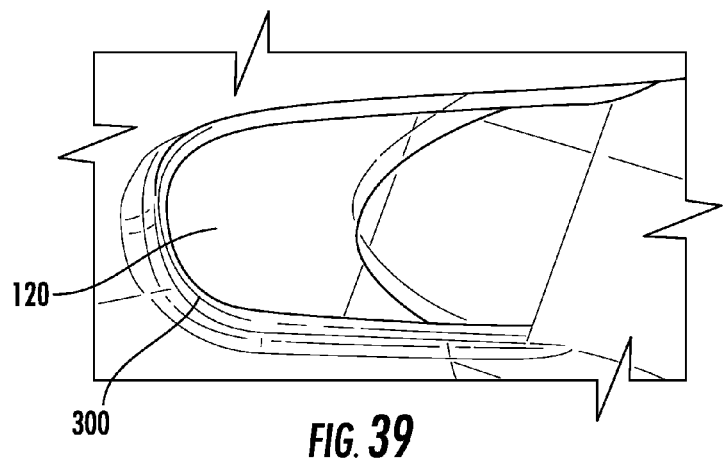
FIG. 39 is a side view of the converging flow joint insert of FIG. 38.
Figures 40, 41:
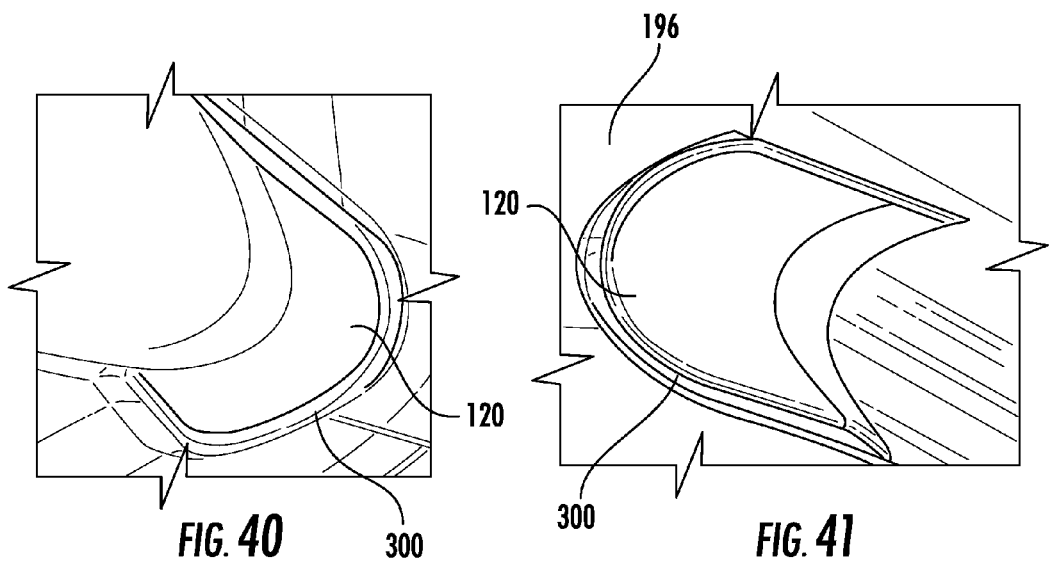
FIG. 40 is a right side view of the converging flow joint insert of FIG. 38.
FIG. 41 is a left side view of the converging flow joint insert of FIG. 38.
Figure 42:
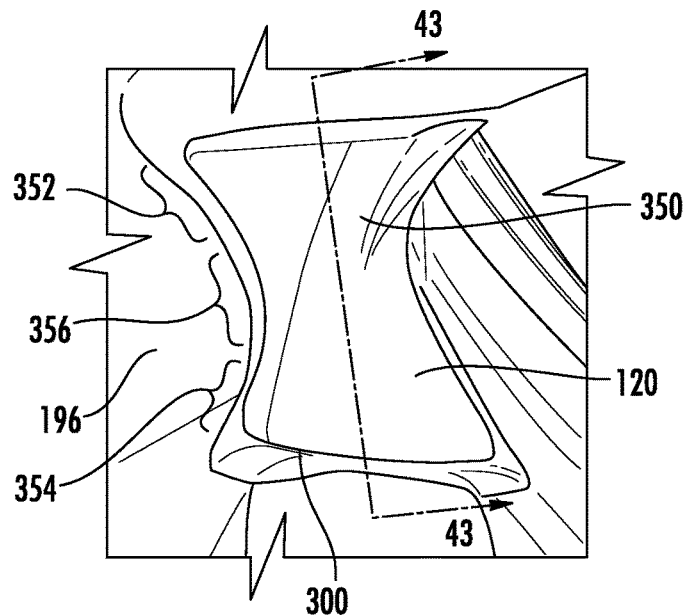
FIG. 42 is a perspective view of the converging flow joint insert of FIG. 38.

The internal cooling system 234 may include one or more impingement plates 248, as shown in FIG. 35, positioned in the internal cooling chamber 236 and extending from a first side 250 to a second side 252 opposite to the first side 250 forming the converging flow joint insert 120. The impingement plate 120 may include one or more impingement orifices 254, and, in at least one embodiment, may include a plurality of impingement orifices 254. In another embodiment, as shown in FIG. 36, the internal cooling system 234 may include one or more internal cooling chambers 236 having an internal volume less than one half of a volume of outer walls 242 forming the converging flow joint insert 120. One or more exhaust orifices 238 may extend from an inlet 240 in the internal cooling chamber 236 through the outer wall 256 forming the first section 220 of the converging flow joint insert 120. The first section 220 may have a uniform thickness from the first side 222 to the second side 224 opposite to the first side 222. One or more exhaust orifices 238 may extend from an inlet 240 in the internal cooling chamber 236 through an outer wall 242 forming a second section 226 of the converging flow joint insert 120. The second section 226 may extend from the first section 220 and may form an outer downstream tip 228 of the converging flow joint insert 120. The second section 226 may have a nonuniform thickness with a thickness at the outer downstream tip 228 being less than a thickness at an upstream edge 230 of the second section 226.

In another embodiment, as shown in FIGS. 38-46, the transition duct system 100 may have an alternative configuration. The transition duct system 100 may include the first and second transition duct bodies 126, 128 as previously set forth, but may include an alternative configuration for the converging flow joint insert 120. The transition duct system 100 may include converging flow joint insert 120 positioned within a recess 300 at a downstream end 302 of the converging flow joint 196 to form a trailing edge 301 of the converging flow joint 196. The recess 300 may be positioned within the converging flow joint 196 and may be configured to receive and house the converging flow joint insert 120. In this embodiment, the converging flow joint insert 120 may extend through the outer wall 202 at a downstream end 204 of the converging flow joint 196. Instead, the converging flow joint insert 120 may be contained completely within the recess 300 with a portion exposed to form the trailing edge 122 of the converging flow joint 196.

The transition duct system 100 may include converging flow joint insert 120 positioned within a recess 300 at a downstream end 302 of the converging flow joint 196 to form a trailing edge 301 of the converging flow joint 196. The recess 300 may be positioned within the converging flow joint 196 and may be configured to receive and house the converging flow joint insert 120. In this embodiment, the converging flow join insert 120 may extend through the outer wall 202 at a downstream end 204 of the converging flow joint 196. Instead, the converging flow join insert 120 may be contained completely within the recess 300 with a portion exposed to form the trailing edge 122 of the converging flow joint 196.

The transition duct system 100 may be held in place within the recess 300 via an insert attachment system 303 configured to attached the converging flow joint insert 120 to the converging flow joint 196. In at least one embodiment, the insert attachment system 303 may be formed from one or more pins 304 extending into the converging flow joint insert 120 and into the converging flow joint 196. In at least one embodiment, the insert attachment system 303 may include one or more pins 304 extending through the converging flow joint insert 120 and through the converging flow joint 196. The insert attachment system 303 may include one or more collars 306 for securing a first end 308 of the pin 304. The collar 306 may be integrally formed with the pin 304 or may be attached to the pin via welding or other appropriate method. A second end 310 of the pin 304 that is generally on an opposite end of the pin 304 relative to the first end 308 may or may not include a collar 306. The pin 304 near the second end 310 may be secured to the converging flow joint 196 via welding or other appropriate method.

The transition duct system 100 may include an internal cooling system 312 within the converging flow joint insert 120. The internal cooling system 312 may include one or more internal cooling chambers 314 in fluid communication with one or more exhaust orifices 316 extending from an inlet 318 in the internal cooling chamber 314 through an outer wall 320 forming the converging flow joint insert 120. The exhaust orifice 316 of the internal cooling system 312 may include one or more exhaust orifices 316 extending from the internal cooling chamber 314 to an exhaust outlet 322 at an outer surface 324 facing a surface 326 forming the recess 300 in which the converging flow joint insert 120 resides. The internal cooling system 312 may also include one or more exhaust orifices 318 extending from the internal cooling chamber 314 to exhaust outlets 330 at an outer surface 332 facing downstream and away from the recess 300 in which the converging flow joint insert 120 resides.

Figure 43:
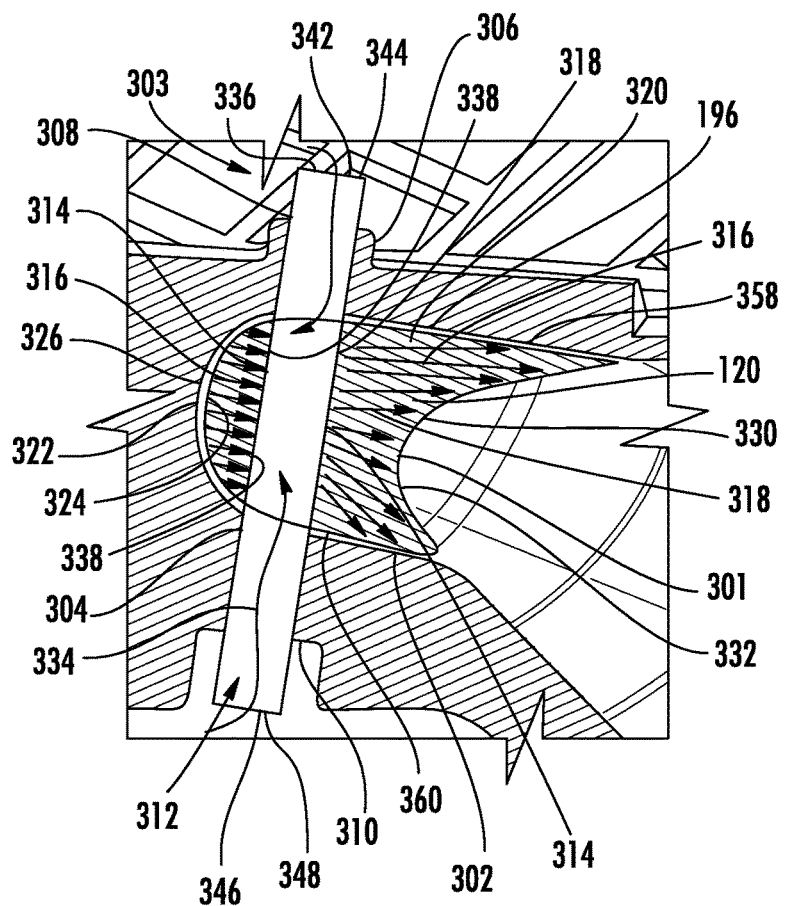
FIG. 43 is a cross-sectional side view of the converging flow joint insert of FIG. 38 taken along section line 43-43 in FIG. 42.
Figures 44, 45:
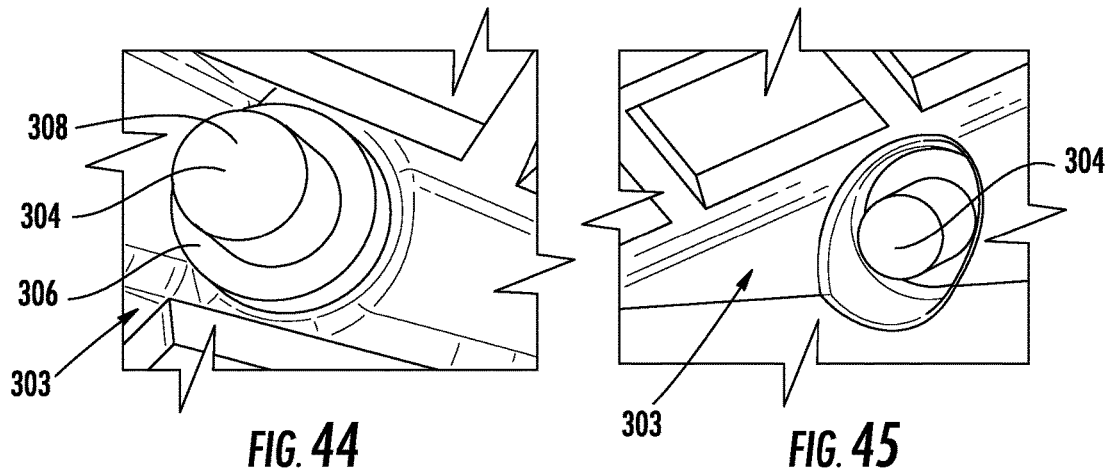
FIG. 44 is a perspective view of a first end of the pin extending through the converging flow joint insert of FIG. 38.
FIG. 45 is a perspective view of a second end of the pin extending through the converging flow joint insert of FIG. 38.
Figure 46:
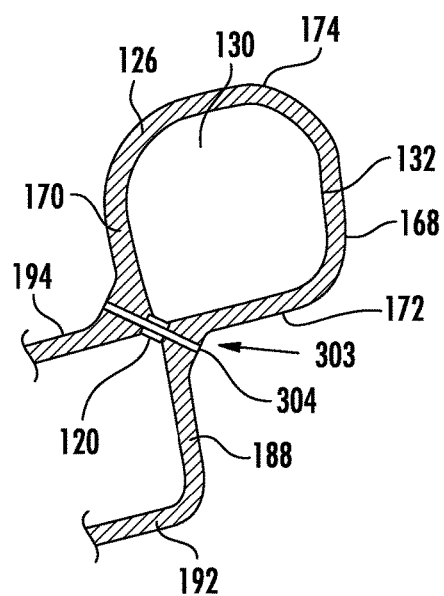
FIG. 46 is a cross-sectional view of the converging flow joint insert of FIG. 38 positioned within a converging flow joint insert receiver at an intersection between two adjacent transition ducts.

In at least one embodiment, a portion of the internal cooling system 312 may be contained within the pin 304 forming at least a portion of the insert attachment system 303 configured to attached the converging flow joint insert 120 to the converging flow joint 196. The pin 304 may include an inner channel 334 having at least one inlet 336 positioned outside of the recess 300 at the downstream end 204 of the converging flow joint 196 and may include one or more exhaust outlets 338 in fluid communication with an internal cooling chamber 340. In at least one embodiment, the pin 304 may include a first inlet 342 at a first end 344 of the pin 304 in communication with the inner channel 334 in the pin 304 and may include a second inlet 346 in a second end 348 of the pin 304 at an opposite end of the pin 304 from the first end 344. The converging flow joint insert 120 may include a body 350 including an outer section 352, an inner section 354 and a middle section 356 between the outer and inner sections 352, 354. The middle section 356 may have a cross-sectional area narrower in width than cross-sectional areas of the outer and inner sections 352, 354. The inner section 354 may extend further downstream than the middle section 356, and the outer section 352 may extend further downstream than the inner section 354. A cross-sectional area at a distal end 358 of the outer section 352 may be larger than a cross-sectional area at a distal end 360 of the inner section 354, as shown in FIG. 43.

In at least one embodiment, the converging flow joint insert 120 of the converging flow joint 196 may be essentially load free when positioned within the converging flow joint insert receiver 136. In another embodiment, the converging flow joint insert 120 of the converging flow joint 196 may be formed from a material having a larger coefficient of thermal expansion than a material forming the converging flow joint insert receiver 136. As such, during use when the converging flow joint insert 120 and the converging flow joint insert receiver 136 are exposed to the hot combustion gases, the converging flow joint insert 120 will thermally expand at a faster rate than the converging flow joint insert receiver 136. As such, the converging flow joint insert 120 will be placed under at least a partial load formed from a compressive load, which partially alleviates the compressive load and stress placed on the converging flow joint insert receiver 136 and surrounding structure. The load and stress created in the converging flow joint insert 120 is less than at a trailing edge in a conventional system without a converging flow joint insert 120. This is beneficial because stresses are transferred from the permanent/high cost material forming the converging flow joint insert receiver 136 and related components to the modular, disposable converging flow joint insert 120.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. A transition duct system for routing gas flow in a combustion turbine subsystem that includes a first stage blade array having a plurality of blades extending in a radial direction from a rotor assembly for rotation in a circumferential direction, the circumferential direction having a tangential direction component, an axis of the rotor assembly defining a longitudinal direction, and at least one combustor located longitudinally upstream of the first stage blade array and located radially outboard of the first stage blade array, the transition duct system comprising:

a first transition duct body having an internal passage extending between an inlet and an outlet;

wherein the outlet of the first transition duct body is offset from the inlet of the first transition duct body in the longitudinal direction and the tangential direction;

wherein the outlet of the first transition duct body is formed from a radially outer side opposite to a radially inner side, and the radially outer side and the radially inner side are coupled together with opposed first and second side walls;

a second transition duct body having an internal passage extending between an inlet and an outlet;

wherein the outlet of the second transition duct body is offset from the inlet of the second transition duct body in the longitudinal direction and the tangential direction;

wherein the outlet of the second transition duct body is formed from a radially outer side opposite to a radially inner side, and the radially outer side and the radially inner side are coupled together with opposed first and second side walls;

wherein the first side wall of the first transition duct body intersects with the second side wall of the second transition duct body forming a converging flow joint; and a converging flow joint insert extending through an outer wall of the converging flow joint and positioned at a downstream end of the converging flow joint to form a trailing edge of the converging flow joint, wherein an internal cooling system within the converging flow joint insert comprises at least one internal cooling chamber having an internal volume less than one half of a volume contained within outer walls forming the converging flow joint insert, at least one exhaust orifice extending from an inlet at the at least one internal cooling chamber through an outer wall forming a first section of the converging flow joint insert, wherein the first section has a uniform thickness from a first side of the converging flow joint insert to a second side of the converging flow joint insert opposite to the first side of the converging flow joint insert, and further comprising at least one exhaust orifice extending from an inlet at the at least one internal cooling chamber through an outer wall forming a second section of the converging flow joint insert, wherein the second section extends from the first section and forms an outer downstream tip of the converging flow joint insert, wherein the second section has a nonuniform thickness with a thickness at the outer downstream tip being less than a thickness at an upstream edge of the second section.

2. A transition duct system for routing gas flow in a combustion turbine subsystem that includes a first stage blade array having a plurality of blades extending in a radial direction from a rotor assembly for rotation in a circumferential direction, the circumferential direction having a tangential direction component, an axis of the rotor assembly defining a longitudinal direction, and at least one combustor located longitudinally upstream of the first stage blade array and located radially outboard of the first stage blade array, the transition duct system comprising:
- a first transition duct body having an internal passage extending between an inlet and an outlet;
- wherein the outlet of the first transition duct body is offset from the inlet of the first transition duct body in the longitudinal direction and the tangential direction;
- wherein the outlet of the first transition duct body is formed from a radially outer side opposite to a radially inner side, and the radially outer side and the radially inner side are coupled together with opposed first and second side walls;
- a second transition duct body having an internal passage extending between an inlet and an outlet;
- wherein the outlet of the second transition duct body is offset from the inlet of the second transition duct body in the longitudinal direction and the tangential direction;
- wherein the outlet of the second transition duct body is formed from a radially outer side opposite to a radially inner side, and the radially outer side and the radially inner side are coupled together with opposed first and second side walls;
- wherein the first side wall of the first transition duct body intersects with the second side wall of the second transition duct body forming a converging flow joint;
- a converging flow joint insert extending through an outer wall of the converging flow joint and positioned at a downstream end of the converging flow joint to form a trailing edge of the converging flow joint;
- an internal cooling system within the converging flow joint insert, the internal cooling system having an internal cooling chamber;
- a converging flow joint insert receiver positioned at the converging flow joint and in which the converging flow joint insert is positioned,
- wherein a body of the converging flow joint insert includes a first section with a uniform thickness from a first side of the converging flow joint insert to a second side of the converging flow joint insert opposite to the first side of the converging flow joint insert and a second section extending from the first section and forming an outer downstream tip of the converging flow joint insert, wherein the second section has a nonuniform thickness with a thickness at the outer downstream tip being less than a thickness at an upstream edge of the second section;
- at least one exhaust orifice extending from an inlet at the internal cooling chamber through an outer wall forming the first section of the converging flow joint insert; and
- at least one exhaust orifice extending from an inlet at the internal cooling chamber through an outer wall forming the second section of the converging flow joint insert.

3. A transition duct system for routing gas flow in a combustion turbine subsystem that includes a first stage blade array having a plurality of blades extending in a radial direction from a rotor assembly for rotation in a circumferential direction, the circumferential direction having a tangential direction component, an axis of the rotor assembly defining a longitudinal direction, and at least one combustor located longitudinally upstream of the first stage blade array and located radially outboard of the first stage blade array, the transition duct system comprising:
- a first transition duct body having an internal passage extending between an inlet and an outlet;
- wherein the outlet of the first transition duct body is offset from the inlet of the first transition duct body in the longitudinal direction and the tangential direction;
- wherein the outlet of the first transition duct body is formed from a radially outer side opposite to a radially inner side, and the radially outer side and the radially inner side are coupled together with opposed first and second side walls;
- a second transition duct body having an internal passage extending between an inlet and an outlet;
- wherein the outlet of the second transition duct body is offset from the inlet of the second transition duct body in the longitudinal direction and the tangential direction;
- wherein the outlet of the second transition duct body is formed from a radially outer side opposite to a radially inner side, and the radially outer side- and the radially inner side are coupled together with opposed first and second side walls;
- wherein the first side wall of the first transition duct body intersects with the second side wall of the second transition duct body forming a converging flow joint;
- a converging flow joint insert extending through an outer wall of the converging flow joint and positioned at a downstream end of the converging flow joint to form a trailing edge of the converging flow joint;
- an internal cooling system within the converging flow joint insert,
- wherein the internal cooling system comprises at least one internal cooling chamber in fluid communication with at least one exhaust orifice extending from an inlet at the at least one internal cooling chamber through an outer wall forming a first section of the converging flow joint insert, wherein the first section includes an outer downstream tip of the converging flow joint insert and wherein an outlet of the at least one exhaust orifice is positioned at an outer surface of the outer wall forming the first section of the converging flow joint insert; and
- at least one impingement plate positioned in the at least one internal cooling chamber and extending from a first side of the converging flow joint insert to a second side of the converging flow joint insert opposite to the first side of the converging flow joint insert, wherein the at least one impingement plate includes a plurality of impingement orifices.

4. The transition duct system of claim 3, wherein the at least one internal cooling chamber has an internal volume less than one half of a volume contained within outer walls forming the converging flow joint insert.

5. The transition duct system of claim 4, further comprising at least one exhaust orifice extending from an inlet at the at least one internal cooling chamber through an outer wall forming a second section of the converging flow joint insert, wherein the second section has a uniform thickness from the first side of the converging flow joint insert to the second side of the converging flow joint insert, and wherein the first section extends from the second section and forms an outer downstream tip of the converging flow joint insert, wherein the first section has a nonuniform thickness with a thickness at the outer downstream tip being less than a thickness at an upstream edge of the first section.

6. The transition duct system of claim 3, wherein the converging flow joint insert is disconnected from the first side wall of the first transition duct body and the second side wall of the second transition duct body.

7. The transition duct system of claim 3, further comprising a converging flow joint insert receiver, wherein the converging flow joint insert receiver includes at least one inner wall defining at least one insert receiving orifice, the at least one inner wall providing support to the converging flow joint insert and including at least one flange contact surface configured to support a flange positioned at a first end of the converging flow joint insert to prevent the converging flow joint insert from being ingested into a turbine downstream of the transition duct system.

8. The transition duct system of claim 7, wherein the converging flow joint insert is removably attached within the transition duct system and is formed from a material with a higher coefficient of thermal expansion than a material forming the converging flow joint insert receiver.

9. The transition duct system of claim 3, wherein the first side wall of the first transition duct body is configured to be coplanar with the second side wall of the second transition duct body when assembled beside the first transition duct body.

10. The transition duct system of claim 3, wherein longitudinal axes of the first and second transition duct bodies are offset from each other in the circumferential direction.

11. The transition duct system of claim 3, wherein the converging flow joint insert is formed from a body with a flange positioned at a first end of the converging flow joint insert to prevent the converging flow joint insert from being ingested into a turbine downstream of the transition duct system.

12. The transition duct system of claim 11, wherein the flange of the converging flow joint insert has a larger cross-sectional area than the body of the converging flow joint insert.

13. The transition duct system of claim 11, wherein the body of the converging flow joint insert includes a second section with a uniform thickness from the first side of the converging flow joint insert to a second side of the second section of the converging flow joint insert, the first section extending from the second section, and wherein the first section has a nonuniform thickness with a thickness at the outer downstream tip being less than a thickness at an upstream edge of the first section.

14. The transition duct system of claim 3, wherein the at least one exhaust orifice comprises a plurality of exhaust orifices extending from inlets at the at least one internal cooling chamber through the outer wall forming the first section of the converging flow joint insert to outlets of the plurality of exhaust orifices positioned at the outer surface of the outer wall forming the first section of the converging flow joint insert.

* * * * *